US011125860B2

(12) United States Patent
Galera et al.

(10) Patent No.: US 11,125,860 B2
(45) Date of Patent: Sep. 21, 2021

(54) TRIANGULATION APPLIED AS A SAFETY SCANNER

(71) Applicants: Rockwell Automation Technologies, Inc., Mayfield Heights, OH (US); TELEDYNE INNOVACIONES MICROELECTRONICS, S.L.U., Seville (ES)

(72) Inventors: Richard Galera, Nashua, NH (US); Anne E. Bowlby, Lowell, MA (US); Derek W. Jones, Galloway (GB); Nilesh Pradhan, South Grafton, MA (US); Amanda Jimenez Marrufo, Camas (ES); Fernando Manuel Medeiro Hidalgo, Seville (ES); Rafael Dominguez Castro, Benacazón (ES); Rafael Romay Juárez, Seville (ES); Sergio Morillas Castillo, Seville (ES)

(73) Assignee: Rockwell Automation Technologies, Inc., Mayfield Heights, OH (US)

( * ) Notice: Subject to any disclaimer, the term of this patent is extended or adjusted under 35 U.S.C. 154(b) by 115 days.

(21) Appl. No.: 15/719,715

(22) Filed: Sep. 29, 2017

(65) Prior Publication Data
US 2019/0101623 A1    Apr. 4, 2019

(51) Int. Cl.
| | |
|---|---|
| *G01S 7/48* | (2006.01) |
| *G01S 17/48* | (2006.01) |
| *G01S 17/02* | (2006.01) |
| *G01S 17/89* | (2006.01) |
| *G01S 17/88* | (2006.01) |
| *G01S 17/04* | (2020.01) |
| *G01S 17/86* | (2020.01) |

(52) U.S. Cl.
CPC ............ *G01S 7/4802* (2013.01); *G01S 17/04* (2020.01); *G01S 17/48* (2013.01); *G01S 17/86* (2020.01); *G01S 17/88* (2013.01); *G01S 17/89* (2013.01)

(58) Field of Classification Search
None
See application file for complete search history.

(56) References Cited

U.S. PATENT DOCUMENTS 9,477,907 B2 * 10/2016 Galera ............... G06K 9/00771
2002/0061134 A1 * 5/2002 Cofer ............... G08B 13/19606
382/181

(Continued)

*Primary Examiner* — Eric L Bolda
(74) *Attorney, Agent, or Firm* — Amin, Turocy & Watson, LLP

(57) ABSTRACT

An optical safety scanner system comprises a first illumination source for detecting presence and distances of people or other objects within a hazardous industrial area based on triangulation, and a second illumination source that verifies accurate and reliable detection by the first illumination source. The first illumination source can project LED or laser light for triangulation of objects, and the second illumination source can project a wide beam of light for detection of other intrusive objects that may be blocking the scanner system's camera and preventing accurate triangulation of people or vehicles. If the image frame generated based on the second light identifies presence of an object that is not detected by the triangulation analysis of the laser light, the safety scanner system assumes that an object is obstructing the safety scanner system's camera, and performs a suitable safety action.

20 Claims, 25 Drawing Sheets

(56) References Cited

U.S. PATENT DOCUMENTS

2005/0207618 A1\* 9/2005 Wohler ................ B25J 9/1674
   382/103
2010/0157278 A1\* 6/2010 Horsch ................ G01S 7/4802
   356/3.01

\* cited by examiner

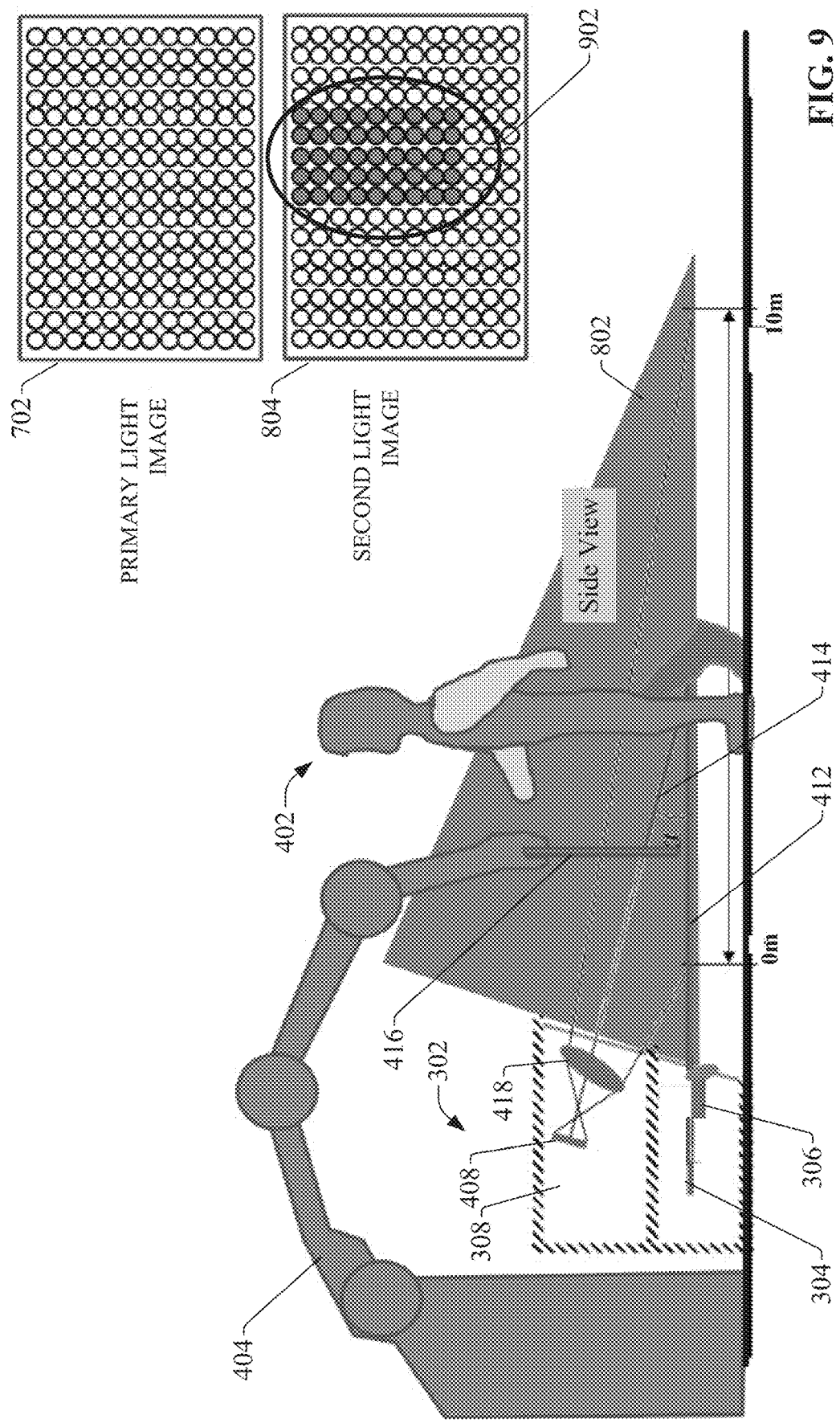

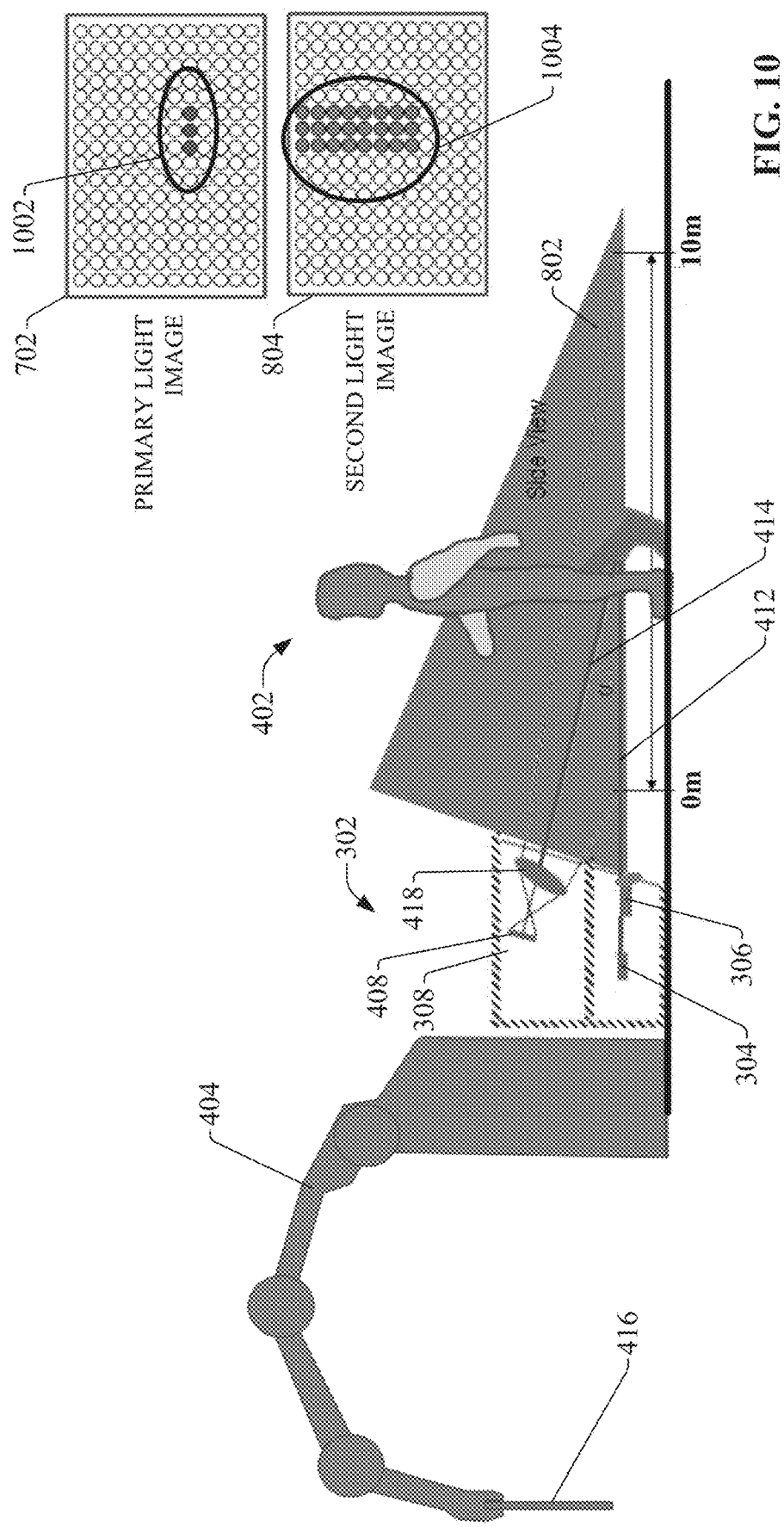

TRIANGULATION APPLIED AS A SAFETY SCANNER

BACKGROUND

The subject matter disclosed herein relates generally to industrial safety, and, more particularly, to optical safety scanners that detect presence and distances of people or other objects within a hazardous industrial area.

BRIEF DESCRIPTION

The following presents a simplified summary in order to provide a basic understanding of some aspects described herein. This summary is not an extensive overview nor is it intended to identify key/critical elements or to delineate the scope of the various aspects described herein. Its sole purpose is to present some concepts in a simplified form as a prelude to the more detailed description that is presented later.

In one or more embodiments, a safety scanner system is provided comprising a light source component configured to emit a first beam of light during a first stage of a scan cycle; a supplemental illumination component configured to emit a second beam of light during a second stage of the scan cycle, wherein the first stage and the second stage alternate in time; a receiver array component configured to generate first image data during the first stage based on receipt of first reflected light comprising a portion of the first beam of light, and to generate second image data during the second stage based on receipt of second reflected light comprising a portion of the second beam of light; a distance determination component configured to generate distance information based on triangulation analysis performed on the first image data; and a hazard analysis and decision component generate a safety output signal in response to determining that the distance information satisfies a defined criterion, and wherein the hazard analysis and decision component is further configured to, in response to detecting presence of an object during the second stage based on analysis of the second image data without detecting the presence of the object based on the triangulation analysis performed on the first image data, generate fault message data indicating a fault in the safety scanner system.

Also, one or more embodiments provide a method, comprising projecting, by a safety scanner system comprising a processor during a first stage of a scan cycle, a first beam of light; generating, by the safety scanner system, first image data based on receipt of first reflected light comprising a portion of the first beam; generating, by the safety scanner system, distance data based on triangulation analysis performed on the first image data; projecting, by the safety scanner system during a second stage of the scan cycle, a second beam of light, wherein the projecting the first beam and the projecting the second beam are performed at alternate times; generating, by the safety scanner system, second image data based on receipt of second reflected light comprising a portion of the second beam; in response to determining that the distance data satisfies a defined criterion, outputting, by the safety scanner system, a safety signal; and in response to detecting presence of an object based on analysis of the second image data during the second stage without detecting the presence of the object based on the triangulation analysis performed on the first image data during the first stage, generating, by the safety scanner system, fault message data indicating a fault in the safety scanner system.

Also, according to one or more embodiments, a non-transitory computer-readable medium is provided having stored thereon instructions that, in response to execution, cause a safety scanner system comprising a processor to perform operations, the operations comprising emitting, during a first stage of a scan cycle, a first beam of light; generating first image data based on receipt of first reflected light comprising a portion of the first beam; performing triangulation analysis on the first image data to yield distance information; emitting, during a second stage of the scan cycle, a second beam of light, wherein the first beam and the second beam are emitted at alternate times; generating second image data based on receipt of second reflected light comprising a portion of the second beam; in response to determining that the distance information satisfies a defined criterion, generating a safety output signal; in response to determining that analysis of the second image data detects presence of an object and that the triangulation analysis does not detect the presence of the object, generating fault message data indicating a fault in the safety scanner system.

To the accomplishment of the foregoing and related ends, certain illustrative aspects are described herein in connection with the following description and the annexed drawings. These aspects are indicative of various ways which can be practiced, all of which are intended to be covered herein. Other advantages and novel features may become apparent from the following detailed description when considered in conjunction with the drawings.

BRIEF DESCRIPTION OF THE DRAWINGS

FIG. 9 is a diagram depicting a side view of an example industrial application including a supplemental illumination component.

FIG. 10 is a diagram depicting a side view of an example industrial application in which a robot has moved a workpiece behind the safety scanning system.

DETAILED DESCRIPTION

Figure 1:
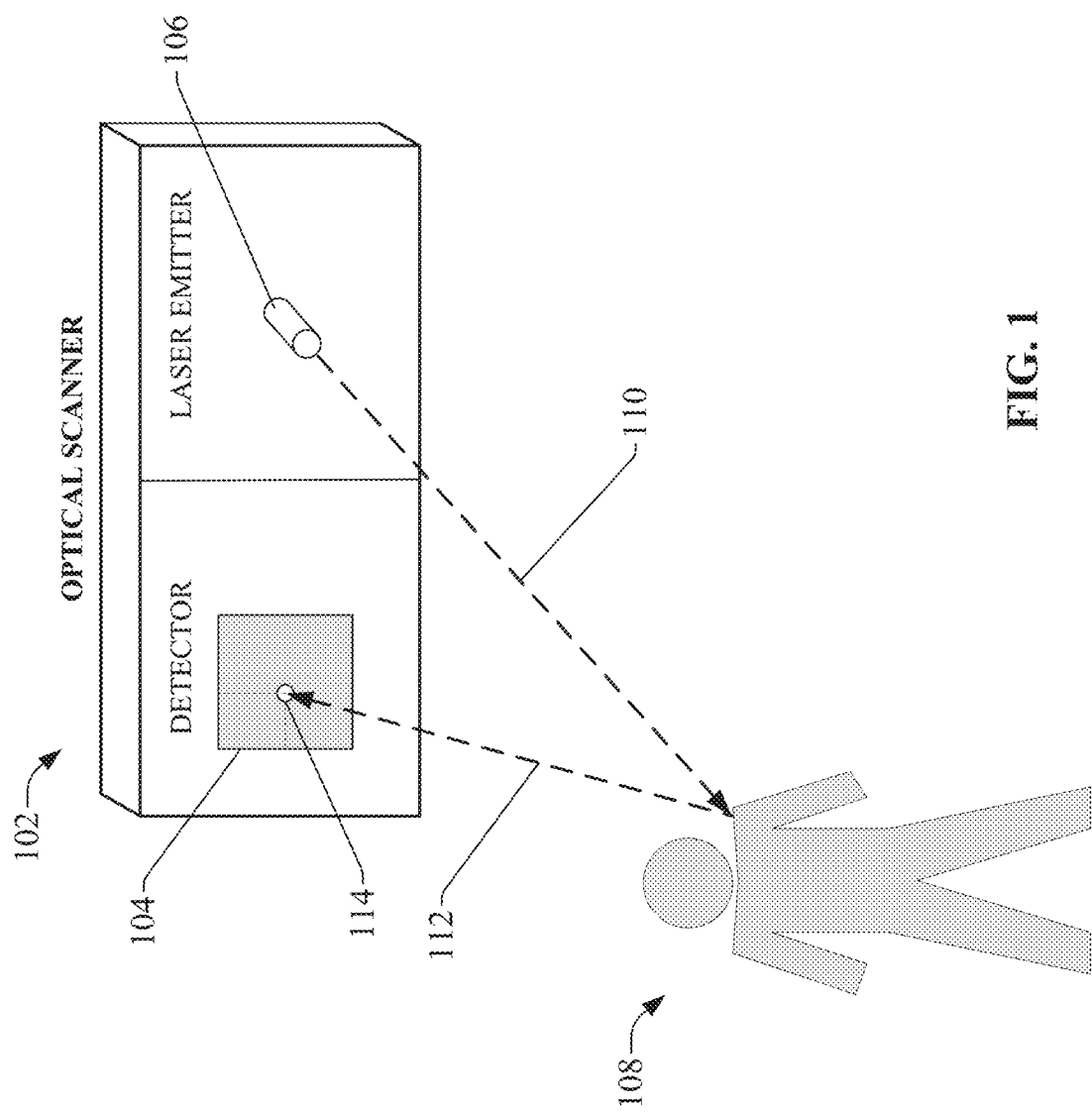
FIG. 1 is a diagram illustrating general triangulation principles.

The subject disclosure is now described with reference to the drawings, wherein like reference numerals are used to refer to like elements throughout. In the following description, for purposes of explanation, numerous specific details are set forth in order to provide a thorough understanding thereof. It may be evident, however, that the subject disclosure can be practiced without these specific details. In other instances, well-known structures and devices are shown in block diagram form in order to facilitate a description thereof.

As used in this application, the terms "component," "system," "platform," "layer," "controller," "terminal," "station," "node," "interface" are intended to refer to a computer-related entity or an entity related to, or that is part of, an operational apparatus with one or more specific functionalities, wherein such entities can be either hardware, a combination of hardware and software, software, or software in execution. For example, a component can be, but is not limited to being, a process running on a processor, a processor, a hard disk drive, multiple storage drives (of optical or magnetic storage medium) including affixed (e.g., screwed or bolted) or removable affixed solid-state storage drives; an object; an executable; a thread of execution; a computer-executable program, and/or a computer. By way of illustration, both an application running on a server and the server can be a component. One or more components can reside within a process and/or thread of execution, and a component can be localized on one computer and/or distributed between two or more computers. Also, components as described herein can execute from various computer readable storage media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or a firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that provides at least in part the functionality of the electronic components. As further yet another example, interface(s) can include input/output (I/O) components as well as associated processor, application, or Application Programming Interface (API) components. While the foregoing examples are directed to aspects of a component, the exemplified aspects or features also apply to a system, platform, interface, layer, controller, terminal, and the like.

As used herein, the terms "to infer" and "inference" refer generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

In addition, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Furthermore, the term "set" as employed herein excludes the empty set; e.g., the set with no elements therein. Thus, a "set" in the subject disclosure includes one or more elements or entities. As an illustration, a set of controllers includes one or more controllers; a set of data resources includes one or more data resources; etc. Likewise, the term "group" as utilized herein refers to a collection of one or more entities; e.g., a group of nodes refers to one or more nodes.

Various aspects or features will be presented in terms of systems that may include a number of devices, components, modules, and the like. It is to be understood and appreciated that the various systems may include additional devices, components, modules, etc. and/or may not include all of the devices, components, modules etc. discussed in connection with the figures. A combination of these approaches also can be used.

Some types of three-dimensional (3D) optical scanners employ triangulation principles to measure distance or depth information for objects and surfaces within the scanner's viewing field. FIG. 1 is a diagram illustrating general triangulation principles. Example optical scanner 102 includes a laser emitter 106 and a detector 104 (although FIG. 1 depicts emitter 106 and detector 104 as residing in the same housing, in some implementations the emitter 106 and detector 104 may reside in separate housings mounted in different locations). Laser emitter 106 emits a beam 110 of laser light into a viewing field. When the beam 110 is incident on a physical subject 108 (e.g., a person or object), beam 110 is reflected from the surface of the subject 108, and a portion of the reflected beam 112 is received at detector 104. In some optical scanners, detector 104 is a charge-coupled device (CCD) or position sensitive detector (PSD) comprising an image plane on which the reflected beam 112 is incident. The location of the point 114 on the image plane struck by the reflected beam 114 is a function of the distance of the object from which the beam was reflected. Accordingly, detector 104 generates a distance measurement for the object based on the location of point 114 on the detector's image plane.

Figure 2:
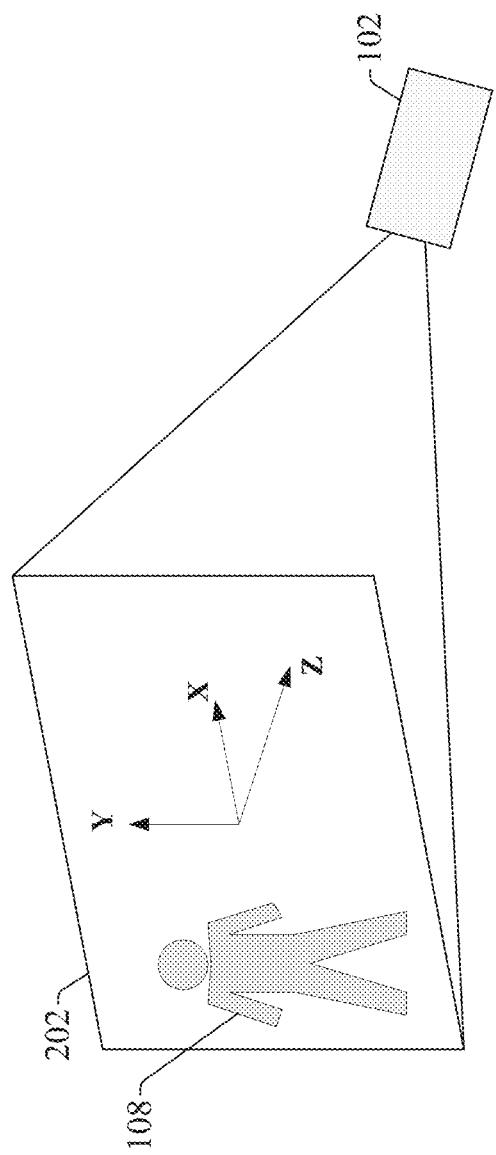
FIG. 2 is a diagram illustrating creation of a depth map.

Some laser optical scanners are configured to sweep the laser beam 110 across the viewing field in an oscillatory manner in order to obtain depth information for the viewing field in a line-wise manner Depth information can be obtained for a horizontal plane of the viewing area by oscillating the laser beam only in one dimension (e.g., in the x-axis direction), while in other implementations a depth map for the entire viewing area can be obtained by oscillating the laser beam in two dimensions (in the x-axis and y-axis directions) in a line-wise manner FIG. 2 is a diagram illustrating creation of a depth map in this manner By sweeping the laser beam across the viewing field in both the x and y directions, optical scanner 102 can generate a three-dimensional image 202 of the viewing area, where distance or depth information is generated for respective points or pixels of the image 202. As shown in FIG. 2, 3D optical scanning in the x and y directions yields distance or depth information in the z-direction (that is, the distance of objects and surfaces from the sensor 204) as well as imaging information in the x-y plane. In some applications, the laser beam may only be swept in one of the x or y directions, yielding depth information across a single horizontal plane within the image.

While optical scanners that use triangulation to generate distance information are often used in the context of scanning and measuring applications, triangulation principles are not conventionally used within the context of industrial safety systems to detect presence of people or prohibited objects within hazardous industrial areas. This is due in part to concerns that triangulation-based optical scanners do not achieve the level of safety reliability required for industrial safety monitoring applications. Moreover, triangulation-based optical scanning can only obtain accurate distance information for relatively short distances from the scanner, and within a small depth of field. Also, physical conditions around many industrial automation systems can give rise to scenarios in which triangulation principles alone may not reliably detect presence of a human or prohibited object (such as a forklift) within a protected hazardous area.

To address these and other issues, one or more embodiments of the present disclosure provide an optical safety scanner system capable of reliably detecting humans or restricted objects as part of an industrial safety monitoring system. In one or more embodiments, the safety scanner system comprises two different illumination sources—a light source that projects a beam of light (e.g., laser light or LED light) for triangulation of objects within the viewing field, and another illumination source that projects a wide beam of light into the viewing field. The safety scanner system alternates between emission of light by the two sources, yielding two different image frames that can be compared in order to verify accurate detection. For example, analysis of the image yielded by the second light can detect presence of an intrusive objects, such as a workpiece or machine component, that may be preventing detection of people or vehicles entering the hazardous area by blocking the reflected light from reaching the scanner system's receiver array. If the image frame generated based on the second light identifies presence of an object that is not detected by the triangulation analysis of the emitted light, the safety scanner system assumes that an object is obstructing the safety scanner system's camera and preventing accurate triangulation and detection of people or vehicles. In response to this discrepancy between the two alternating image frames, the safety scanner system can place the controlled machine or process in a safe state and generate a fault message indicating the condition.

Figure 3:
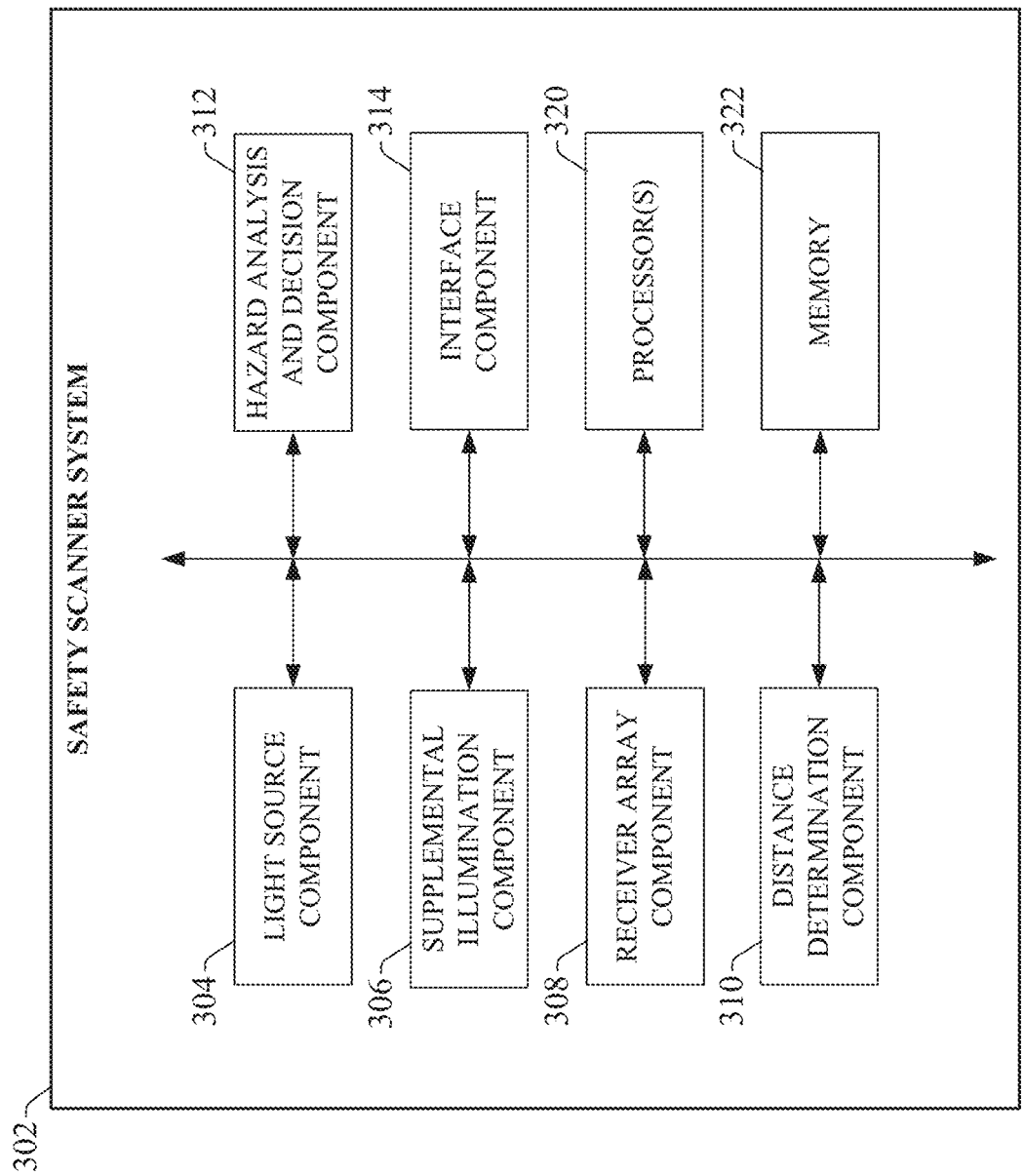
FIG. 3 is a block diagram of an example safety scanner system.

FIG. 3 is a block diagram of an example safety scanner system 302 according to one or more embodiments of this disclosure. Although FIG. 3 depicts certain functional components as residing on a common physical device, it is to be appreciated that one or more of the functional components illustrated in FIG. 3 may reside on separate devices in some embodiments. Aspects of the systems, apparatuses, or processes explained in this disclosure can constitute machine-executable components embodied within machine(s), e.g., embodied in one or more computer-readable mediums (or media) associated with one or more machines. Such components, when executed by one or more machines, e.g., computer(s), computing device(s), automation device(s), virtual machine(s), etc., can cause the machine(s) to perform the operations described.

Safety scanner system 302 can include a light source component 304, a supplemental illumination component 306, a receiver array component 308, a distance determination component 310, a hazard analysis and decision component 312, an interface component 314, one or more processors 320, and memory 322. In various embodiments, one or more of the light source component 304, supplemental illumination component 306, receiver array component 308, distance determination component 310, hazard analysis and decision component 312, interface component 314, the one or more processors 320, and memory 322 can be electrically and/or communicatively coupled to one another to perform one or more of the functions of the safety scanner system 302. In some embodiments, components 304, 306, 308, 310, 312, and 314 can comprise software instructions stored on memory 322 and executed by processor(s) 320. Safety scanner system 302 may also interact with other hardware and/or software components not depicted in FIG.

3. For example, processor(s) 320 may interact with one or more external user interface devices, such as a keyboard, a mouse, a display monitor, a touchscreen, or other such interface devices. Safety scanner system 302 may also include network communication components and associated networking ports for sending data generated by any of components 304, 306, 308, 310, 312, and 314 over a network (either or both of a standard data network or a safety network), or over a backplane.

Light source component 304 can be configured to emit a beam of light into a viewing field. The beam can be a wide, flat beam projected substantially parallel to the floor to yield a viewing plane. The beam may also be a narrow laser beam that is oscillated in one or two dimensions. In various embodiments, light source component 304 can be a laser source, a light-emitting diode (LED) light source, or another type of light source. In one or more embodiments, the light source component 304 can project light from the emission source through a suitable lens to collimate or flatten the beam to yield the monitoring plane. Supplemental illumination component 306 can be configured to emit second light into the viewing field to supplement detection coverage by the primary beam, or to detect conditions that may prevent accurate object measurement by the light emitted by the light source component 304. Receiver array component 308 can be configured to detect reflected light originating from the light source component 304 and the supplemental illumination component 306, and to generate image data based on electrical outputs generated by the reflected light. For example, receiver array component 308 may include a charge-coupled device (CCD), a position sensitive detector (PSD), or another type of image sensor that converts light incident on a receiver array to electrical outputs corresponding to respective pixels of the receiver array. Receiver array component 308 may also include a lens that focuses received light onto an image plane of the CCD or PSD.

Distance determination component 310 can be configured to detect presence of an object within the viewing field based on the electrical outputs generated by receiver array component 308, as well as to determine a distance of the object based on triangulation of the received light. Distance determination component 310 can also be configured to control emission of light by the light source component 304 and supplemental illumination component 306 such that the two light sources emit light at alternate time frames of a scan cycle. By analyzing image frames illuminated by supplemental illumination component 306, distance determination component 310 can determine whether conditions within the viewing field are such that object detection based on triangulation of the light emitted by the light source component 304 may not be reliable.

Hazard analysis and decision component 312 can be configured to analyze and control one or more sensor outputs based on results generated by distance determination component 310. This can include, for example, sending a control signal to a control or safety device (e.g., an industrial controller, an on-board computer mounted in a mobile vehicle, a safety relay, a motor controller, etc.) to perform a control action, initiating a safety action (e.g., removing power from a hazardous machine, switching an industrial system to a safe operating mode or slow operating mode, etc.), sending a notification message to one or more plant personnel via a human-machine interface (HMI) or a personal mobile device, sending data over a safety network, or other such output. Interface component 314 can be configured to exchange data between safety scanner system 302 and one or more other pieces of industrial equipment (e.g., an industrial controller, a safety controller, a robot controller, an industrial machine etc.). For example, interface component 314 may be configured to interface with a plant network (e.g., a control and information protocol network, and Ethernet/IP network, a safety network, etc.) and exchange data with other devices over the network connection.

The one or more processors 320 can perform one or more of the functions described herein with reference to the systems and/or methods disclosed. Memory 322 can be a computer-readable storage medium storing computer-executable instructions and/or information for performing the functions described herein with reference to the systems and/or methods disclosed.

Although components 304-314 are depicted in FIG. 3 as integrated components of a single device, some of the components 304-314 may reside on separate but related hardware components in some implementations. For example, light source component 304 and supplemental illumination component 306 may reside on a first device, while receiver array component 308, distance determination component 310, hazard analysis and decision component 312, and interface component 314 may reside on a second device in communication with the first device. Also, safety scanner system 302 may be one of multiple optical devices that monitor a hazardous zone from various angles and provide imaging data to a central safety controller for analysis, decision-making, and control. In such implementations, one or more of the components 304-314 may reside on the safety controller while other components may reside on one or more other devices.

Figure 4:
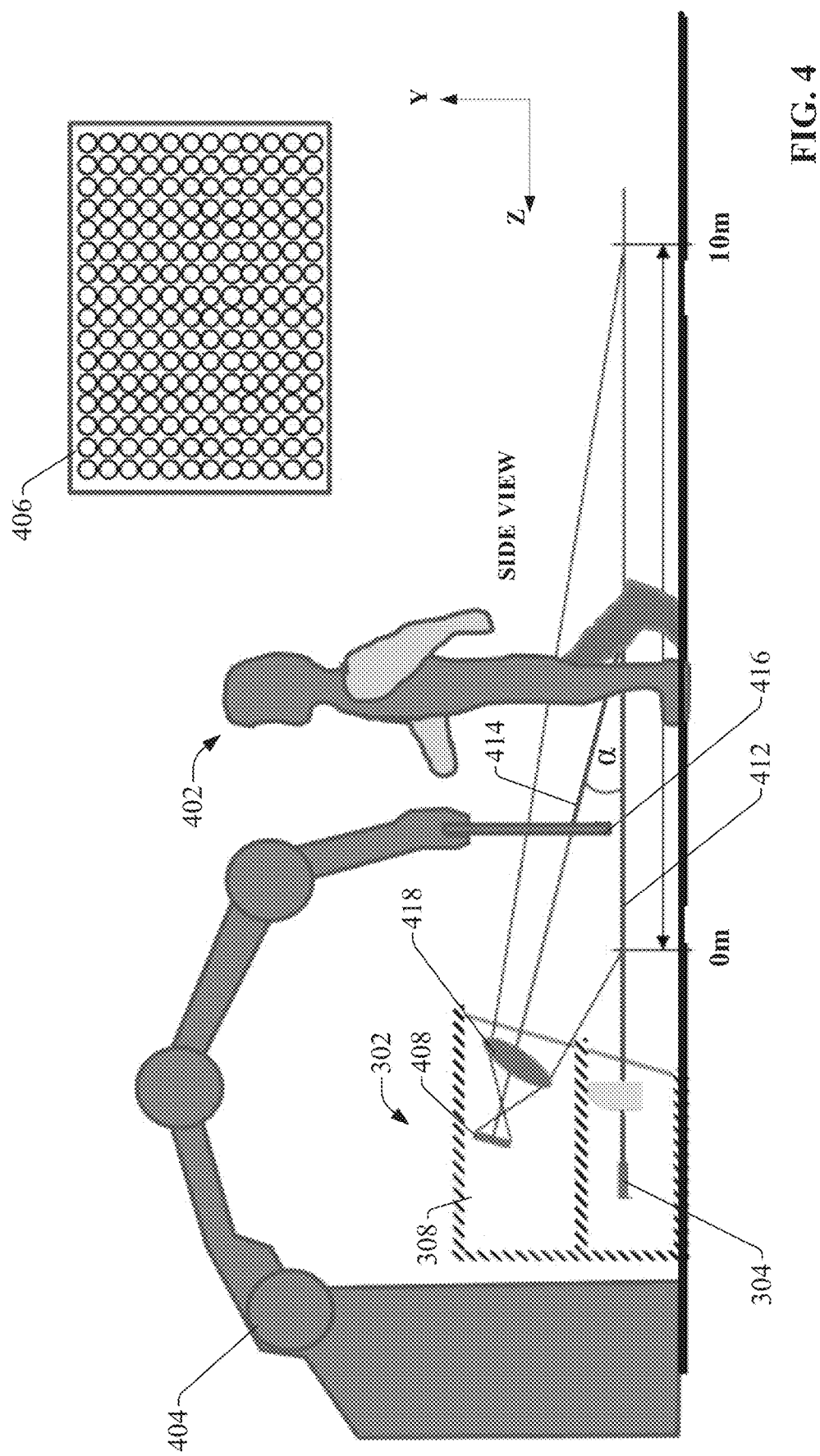
FIG. 4 is a diagram depicting a side view of an example industrial application that uses an embodiment of a safety scanner system.
Figure 5:
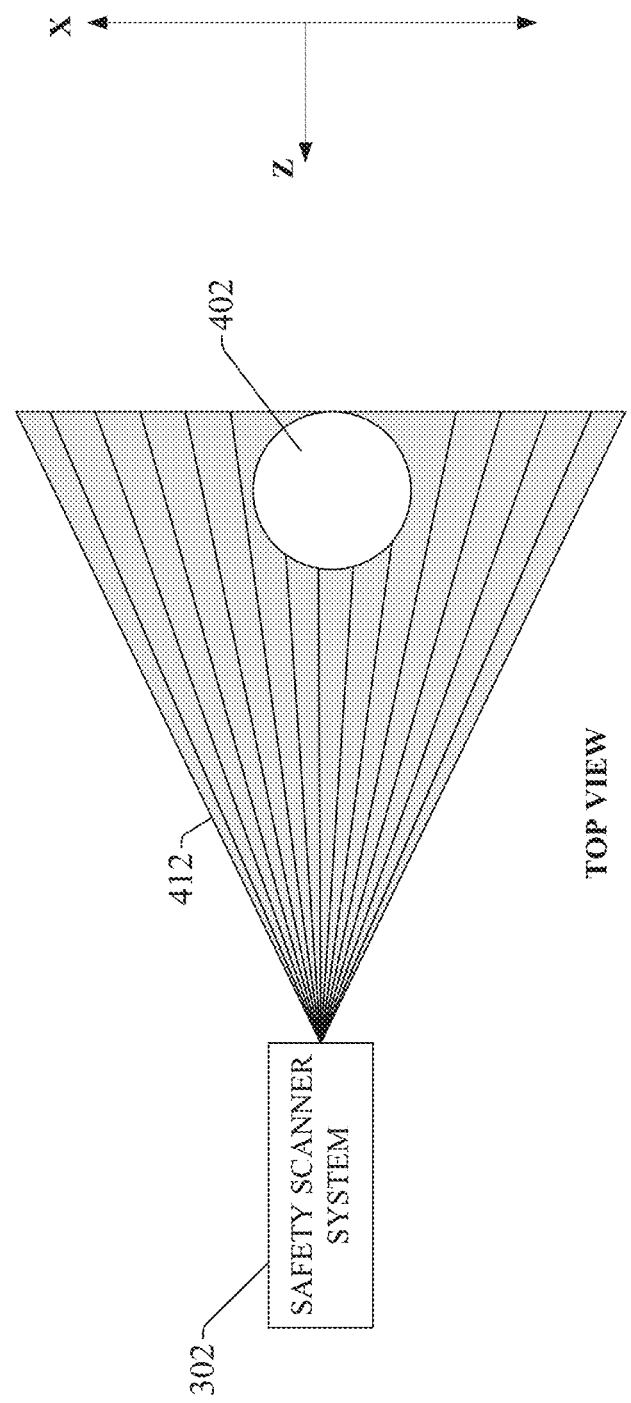
FIG. 5 is a top view of a safety scanner system illustrating the shape of the monitoring plane formed by using a lens to spread light from a light source, or by oscillating a laser beam in the x-axis direction.

FIG. 4 is a diagram depicting a side view of an example industrial application that uses an embodiment of safety scanner system 302. For clarity, FIG. 4 omits supplemental illumination component 306, which will be illustrated and described below. In this example application, safety scanner system 302 is installed near the base of an industrial robot 404 that clamps and moves workpieces 416 between workstations. Safety scanner system 302 is oriented to face away from the robot 404 such that light source component 304 emits light beam 412 toward the hazardous area in front of the robot 404. As noted above light beam 412 can be a laser beam, an LED light beam, or another type of light beam. In this example application, light source component 304 is configured to emit light beam 412 as a wide flat beam, thereby producing a monitoring plane that is substantially parallel with the floor. Light source component 304 can be oriented to project light beam 412 substantially parallel to the ground, and at an elevation that approximately matches the height of the lower leg of a person 402 within the hazardous area in front of robot 404. FIG. 5 is a top view of safety scanner system 302 illustrating the shape of the monitoring plane formed by beam 412. In this configuration, safety scanner system 302 monitors for the presence of people or vehicles within the hazardous zone near the front of robot 404 by detecting the legs or tires of people or vehicles as they enter the hazardous zone.

In one or more embodiments, light source component 304 can be configured to project the wide flat beam 412 by projecting light from a light source (e.g., a laser or LED light source) through an appropriate lens that collimates or flattens the LED light. In other embodiments, rather than projecting beam 412 as a wide flat beam to produce the monitoring plane, light source component 304 can be configured to sweep a narrow laser beam in an oscillatory manner along a single axis (in the left and right direction, or in the direction of the x-axis only), resulting in a monitoring plane that is substantially parallel with the floor.

Returning now to FIG. 4, safety scanner system 302 employs triangulation techniques to detect the presence of people or vehicles (e.g., forklifts or trucks) within the hazardous area surrounding the front of robot 404. When a person 402 enters the hazardous area, light beam 412 emitted by light source component 304 strikes the person's leg, and some of the incident light is reflected to receiver array component 308 as reflected beam 414. A lens 418 of receiver array component 308 focuses the reflected beam 414 to a receiver array 408 (e.g., a CCD, PSD, or other type of receiver array). The location of the point on the receiver array 408 struck by the focused reflected beam 414 is a function of angle α between light beam 412 and reflected beam 414, which itself is a function of the distance of the person 402 from safety scanner system 302. Accordingly, distance determination component 310 (not shown in FIG. 4) can calculate angle α using known distances and angles between the light source component 304 and receiver array component 308, and derive the distance of person 402 from safety scanner system 302 based on this calculated angle α.

Hazard analysis and decision component 312 can be configured to initiate a safety action in response to detection (by the distance determination component 310) of an object within a defined distance from the safety scanner system 302. In some embodiments, hazard analysis and decision component 312 can be configurable, such that the user can set the maximum detected distance (also referred to as the minimum safe distance) that will trigger a safety action. Safety actions that can be performed by hazard analysis and decision component 312 can include, but are not limited to, generation of a control signal directed to an industrial control device or system (e.g., an industrial controller, a safety relay, a motor drive, a safety system, etc.) that controls an industrial machine or process (e.g., robot 404). Such control signals can be sent to the industrial control device via interface component 314, and may be signals instructing the controller to place the controlled machine or process in a safe state (e.g., by bringing the process to a complete halt, by slowing the process to a safe speed or idle mode, by instructing a safety relay to remove power from a movable component of the machine, etc.). In such configurations, interface component 314 may interface with the control device over a hardwired or networked connection, and hazard analysis and decision component 312 can issue control instructions to the control device based on detection of objects observed in the viewing field that are determined to be within the defined maximum distance from the safety scanner system 302.

In another example scenario, the hazard analysis and decision component 312 may be configured to generate feedback information to be rendered on a display device based on object detection and distance. This can include, for example, customized warning messages recommending that a detected person or vehicle follow an alternate path or relocate to a safe area. To facilitate display of feedback messages, hazard analysis and decision component 312 can be configured to interface with a display device (e.g., a human-machine interface device or a text-based message board) mounted near the hazardous area, or may be targeted to a personal device associated with one or more employees.

In order to reliably detect presence of a person or vehicle over relatively long distances, the lens 418 and receiver array 408 of receiver array component 308 can be angled relative to the viewing plane (that is, relative to the x-y plane) in order to increase the depth of field by leveraging the Scheimpflug principle. Per the Scheimpflug principle, angling a camera relative to the viewing plane increases the depth of field within which objects can be reliably detected relative to facing the camera substantially perpendicular to the viewing plane (such that the receiver array 408 is substantially parallel to the x-y plane). In the example illustrated in FIG. 4, receiver array component 308—which acts as a camera comprising lens 418 and receiver array 408—is angled downward relative to the x-y viewing plane in order to achieve a reliable depth of field of approximately 10 meters from a point near the front of safety scanner system 302. However, other ranges may also be achieved by setting a suitable angle for a given application. The extended depth of field achieved by suitable angling of the receiver array component 308 can allow objects at relatively long distances from the safety scanner system 302 to be detected, while allowing the overall size of safety scanner system 302 to remain small.

Some types of industrial automation systems can give rise to scenarios that render object detection based on a single emitted light beam 412 unreliable. FIG. 4 illustrates a machine condition that can prevent detection of a person 402 within the hazardous area. In the illustrated example, robot 404 has moved workpiece 416 to a position in front of the robot 404 that allows emitted light beam 412 to be projected into the hazardous area unobstructed, but which blocks the reflected beam 414 before reaching array component 308. This condition essentially masks person 402 from the receiver array component 308, preventing detection and allowing robot 404 to continue operating despite the presence of person 402 within the hazardous area.

Figure 6:
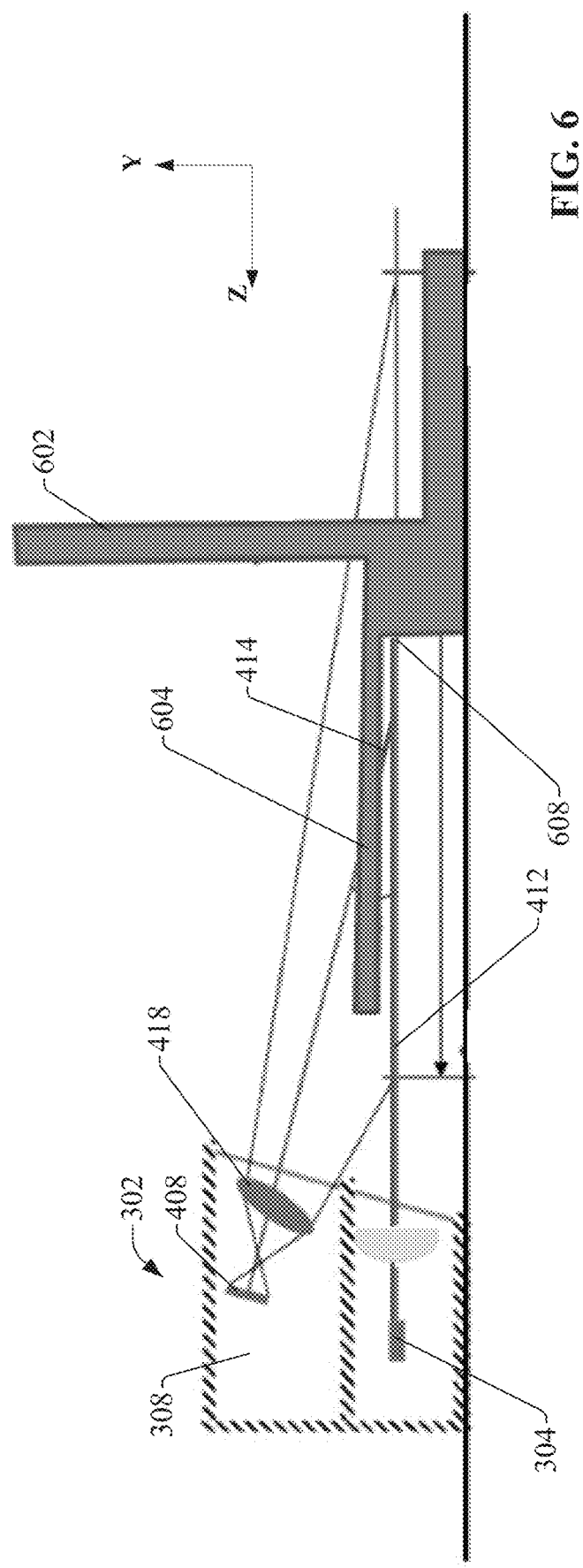
FIG. 6 is a diagram illustrating a scenario in which a forklift can enter a hazardous area without detection by a triangulation beam.

A similar phenomenon can prevent reliable detection of vehicles, such as forklifts. FIG. 6 is a diagram illustrating a scenario in which a forklift 602 can enter a hazardous area without detection by triangulation beam 412. In this example, light source component 304 emits light beam 412 into the viewing space, which strikes an area 608 on the front end of forklift 602 below the forks 604. Since forks 604—which may be carrying a pallet or other load—project outward from the front end of forklift 602, the forks 604 and/or their associated load can block the reflected beam 414 and prevent detection by receiver array component 308, thereby allowing forklift 602 to enter the hazardous area undetected.

Figure 7:
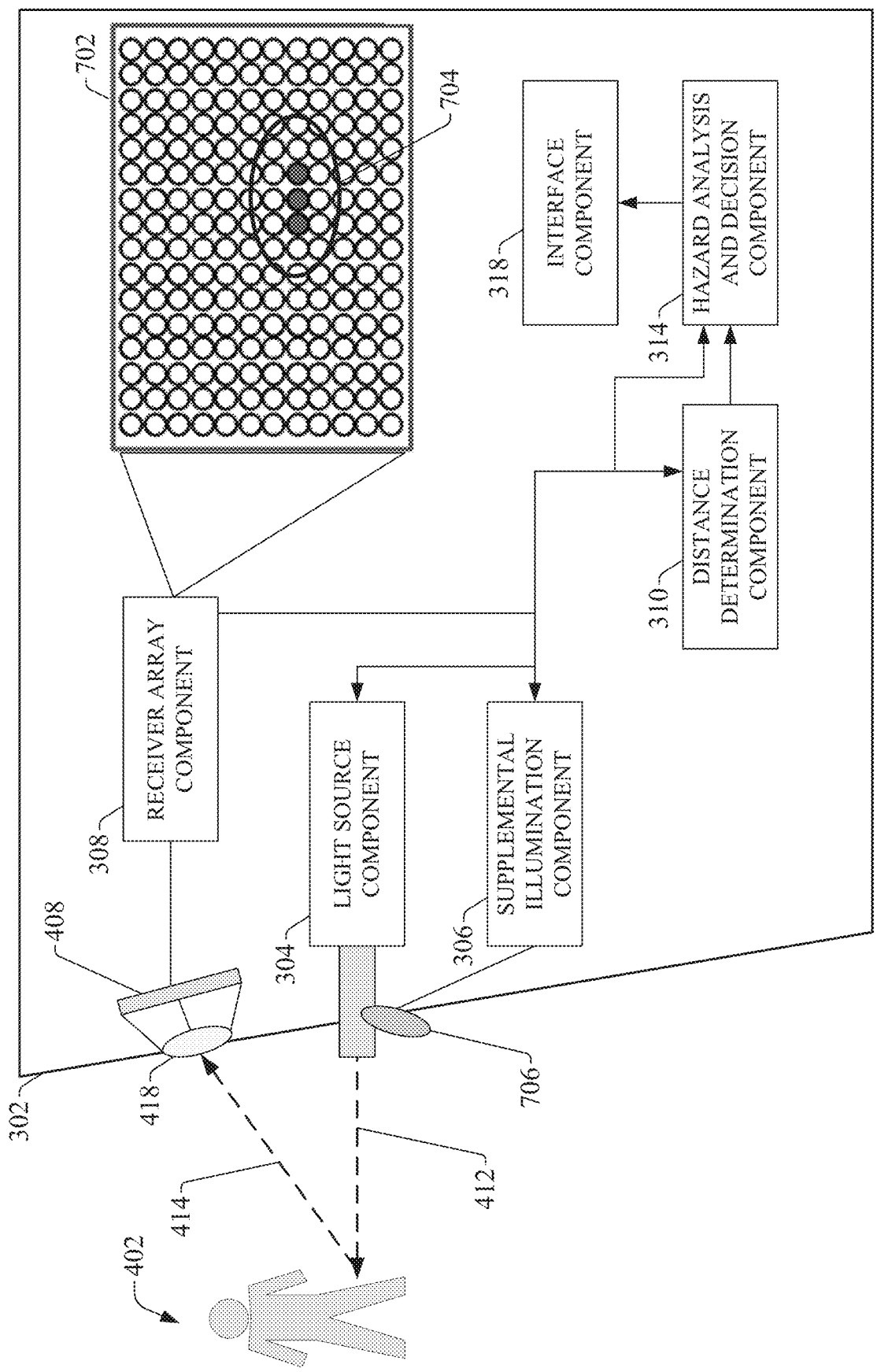
FIG. 7 is a generalized block diagram of a safety scanner system that depicts both a light source component and a supplemental illumination component.

In order to allow for these types of scenarios, safety scanner system 302 can include a second light source to supplement the light source component 304. FIG. 7 is a generalized block diagram of safety scanner system 302 that depicts both light source component 304 and a supplemental illumination component 306. As described above, light source component 304 is configured to emit light beam 412 into the viewing space, and receiver array component 308 is configured to detect a reflected beam 414 returned to the safety scanner as a result of the emitted beam 412 striking an object (e.g., person 402). Light source component 304 can emit light beam 412 as a wide flat beam (e.g., by projecting LED or laser light through a lens that collimates or flattens the beam) or can oscillates a narrow beam in the x-axis direction in order to monitor a plane that is substantially parallel with the ground and raised to approximately the level of a person's lower leg.

Receiver array 408 generates an electrical output for each pixel of the receive array 408 in proportion to the intensity of light incident on the pixel, and receiver array component 308 generates an image 702 comprising a pixel array based on the electrical outputs. The darkened pixels of image 702 represent pixels of receiver array 408 that are struck by reflected beam 414. In the example depicted in FIG. 7, the legs of person 402 have reflected the emitted light beam 412, and the resulting reflected beam 414 has been detected within image 702 as a short horizontal row of pixels 704 having an electrical output that exceeds a threshold indicative of reflected light. As described above, distance determination component 310 uses triangulation techniques to calculate the distance of person 402 from safety scanner system 302 based on the location of pixels 704 within image 702. Hazard analysis and decision component 314 can determine whether the calculated distance satisfies a defined criterion—e.g., whether the distance is less than a defined minimum safe distance configured by a system designer—and in response to determining that the distance satisfies the criterion, initiate a control action. Example control actions can include, but are not limited to, sending a control instruction to an industrial controller via interface component 318 to place a controlled machine or process in a safe state, sending a signal to an industrial safety device to disconnect power from one or more machines, sending an alarm message to a human-machine interface terminal or a client device, or other such actions.

Figure 8:
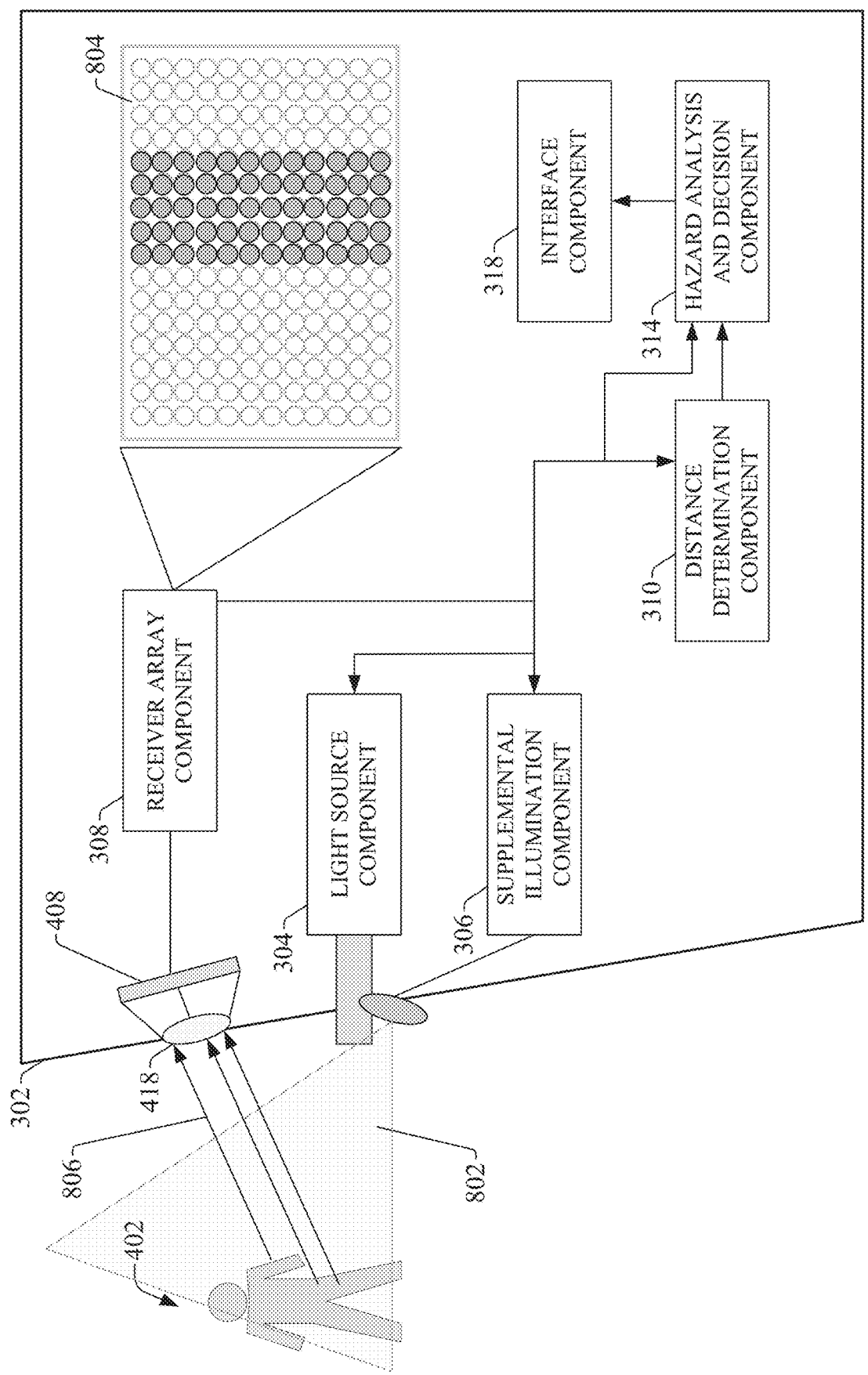
FIG. 8 is the generalized block diagram of a safety scanner system depicting emission of second light by a supplemental illumination component.

In order to reliably detect people or objects even in scenarios such as those depicted in FIGS. 4 and 6, safety scanner system 302 includes a supplemental illumination component 306 that serves as a second light source for detection of objects within the viewing field. FIG. 8 is the generalized block diagram of safety scanner system 302 depicting emission of second light 802 by supplemental illumination component 306. When supplemental illumination component 306 is active, a subset of the second light 802 incident on an object in the viewing field (e.g., person 402) is reflected back to the receiver array component 308 as reflected light 806, and receiver array component 308 generates an image 804 based on the electrical outputs of the pixels of receiver array 408. In some embodiments, supplemental illumination component 306 can be configured to emit a different type of light than that emitted by light source component 304. For example, rather than emitting a flat beam (or a narrow oscillating beam), supplemental illumination component 306 can be configured to emit a wide beam of light (e.g., LED light or another type of light) that substantially encompasses the viewing field. In some such embodiments, distance determination component 310 may not perform distance analysis on the resulting image 804 formed by receiver array component 308. Instead, receiver array component 308 may be configured to perform imaging (2D) analysis on image 804 in order to identify shapes or surface characteristics of objects within the viewing field. Hazard analysis and decision component 314 can then determine whether intrusive objects identified in image 804 are indicative of a condition that may render object detection by the first light beam 412 unreliable, and initiate a control action based on this determination.

Other embodiments of supplemental illumination component 306 can be configured to emit an oscillating laser beam into the viewing field at a different angle relative to the primary beam emitted by light source component 304. In such embodiments, supplemental illumination component 306 may be configured to oscillate the laser beam in both the x-axis and y-axis directions, creating a three-dimensional monitoring space that supplements the substantially two-dimensional monitoring plan formed by the first light beam 412. Alternatively, supplemental illumination component 306 may be configured to oscillate the second laser beam in only one of the x-axis or y-axis direction—or to emit another wide flat beam—to form a second monitoring plane having a different orientation relative to the first monitoring plane formed by beam 412. Such embodiments may be suitable for industrial safety applications in which the two monitoring planes are sufficient to reliably detect objects in all scenarios that may arise within the context of an associated industrial automation system.

In order to differentiate between images produced by reflected light from light beam 412 emitted by light source component 304 and images produced by reflected light from supplemental illumination component 306, receiver array component 308 can be configured to alternate between emission of light beam 412 by the light source component 304 and emission of second light by supplemental illumination component 306, and to inform hazard analysis and decision component 314 which of the two types of images are currently being produced. FIG. 9 is a diagram depicting the side view of the example industrial application illustrated in FIG. 4, with supplemental illumination component 306 included. In this example, receiver array component 308 controls light source component 304 and supplemental illumination component 306 such that light beam 412 and second light 802 are emitted at alternate times. As illustrated in FIG. 9, supplemental illumination component 306 is oriented such that the lower edge of the illumination field created by second light 802 is below monitoring plane of light beam 412, ensuring proper supplemental coverage by second light 802. Alternating between emission of light beam 412 and second light 802 causes two different alternating images to be produced by receiver array component 308—a primary light image 702 produced based on reflected light from light beam 412, and a second light image 804 produced based on reflected second light 802. Receiver array component 308 can synchronize with hazard analysis and decision component 314 so that each of the two types of images is analyzed appropriately according to the light source that gave rise to the image.

The robot condition illustrated in FIG. 4 is reproduced in FIG. 9. Light beam 412 emitted by light source component 304 strikes a person 402 entering the hazardous zone, but the reflected beam 414 is blocked by workpiece 416, preventing reflected beam 414 from reaching the receiver array component 308. Consequently, the primary light image 702 produced by receiver array 408 during emission of light beam 412 shows no pixels corresponding to received reflected light 412, and the person 402 is not detected.

According to one or more embodiments, light source component 304 emits light beam 412 during a first stage of a two-stage scan cycle. During this first stage, light source component 304 emits light beam 412 into the viewing field, and distance determination component 310 performs triangulation analysis on the resulting image 702 in order to detect presence and distance of an object, vehicle, or person within the viewing space. This first stage can be of any suitable duration. During the second stage of the scan cycle, light source component 304 ceases to emit light beam 412, supplemental illumination component 310 begins emitting second light 802 into the viewing field, and second light image 804 is generated by receiver array component 308 based on light received at the receiver array 408 during emission of the second light 802.

In general, the second stage of the scan cycle detects conditions that may render detection of objects or people during the first stage unreliable. In some embodiments, rather than performing three-dimensional analysis on the second light image 804 (as is performed on primary light image 702), hazard analysis and decision component 314 can be configured to perform two-dimensional, or imaging, analysis on image 804 in order to identify objects or surfaces within the viewing space based on shape or pattern recognition. In some cases, such two-dimensional analysis may be sufficient to detect conditions that render detection of objects during the first stage unreliable. In the example illustrated in FIG. 9, a set of pixels 902 corresponding to a portion of the second light 802 reflected from workpiece 416 and received at receiver array component 308 are identified by hazard analysis and decision component 314, indicating presence of an object (workpiece 416) that was not detected by light beam 412 during the first stage of the scan cycle. In response to detecting presence of an object in second light image 804 that was not detected in the primary light image 702, hazard analysis and decision component 314 assumes unreliability of object detection during the first stage of the scan cycle, and generates an output signal that places robot 404 in a safe condition (e.g., a signal to the robot's controller that cause the robot to halt or to enter a slowed operating mode, a signal to a safety controller that causes power to be disconnected from hazardous moving components, etc.). Hazard analysis and decision component 314 can also output an alarm message directed to a suitable target device, including but not limited to a human-machine interface terminal, an LED display board, an alarm server, a personal client device associated with a specified user, etc. The alarm message can indicate that safety scanner system 302 may be experiencing a detection fault due to an intrusive object within the viewing field.

FIG. 10 is a diagram depicting the side view of the example industrial application during a scenario in which robot 404 has moved workpiece 416 behind safety scanning system 302. Since workpiece 416 is no longer blocking receiver array component 308, reflected beam 414 is unobstructed between person 402 and lens 418 of safety scanner system 302. Accordingly, distance determination component 310 detects a row of pixels 1002 within primary light image 702 (generated during the first stage of the scan cycle) corresponding to the portion of reflected beam 414 that reaches the receiver array 408, and interprets this row of pixels 1002 as representing a person, vehicle, or other object within the hazardous zone. During the second stage of the scan cycle, during which emission of light beam 412 is ceased and second light 802 is emitted, hazard analysis and decision component 314 detects a set of pixels 1004 in second light image 804 corresponding to a portion of second light 802 reflected to lens 418 from person 402. Since both image 702 and image 804 detect the presence of person 402 within the hazardous area (that is, results of the first stage and second stage analyses are both in agreement), hazard analysis and decision component 314 will indicate detection of the person 402, but will not indicate a detection fault.

In general, conditions that cause the hazard analysis and decision component 314 to place the robot (or other industrial automation system) in a safe state include (1) detection of an object in primary light image 702 having a distance that is less than the defined minimum safe distance, regardless of the result of analyzing second light image 804 during the second stage, and (2) failure to detect an object in primary light image 702 during the first stage while detecting of an object in the second light image 804 during the second stage. Condition (1) will cause hazard analysis and decision component 314 to generate a control signal placing the robot 404 in a safe state, but will not cause a fault indication to be generated. Condition (2) will also cause analysis and decision component 314 to place the robot 404 in the safe state, and will also cause a fault indication to be generated.

Figure 11A:
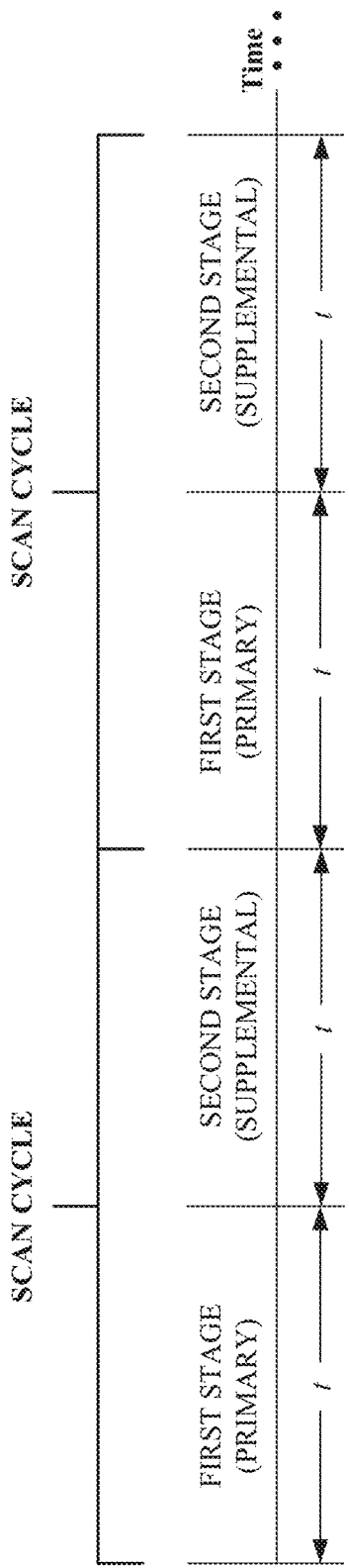
FIGS. 11A and 11B are timing charts depicting consecutive scan cycles comprising alternating first and second stages.
Figure 11B:
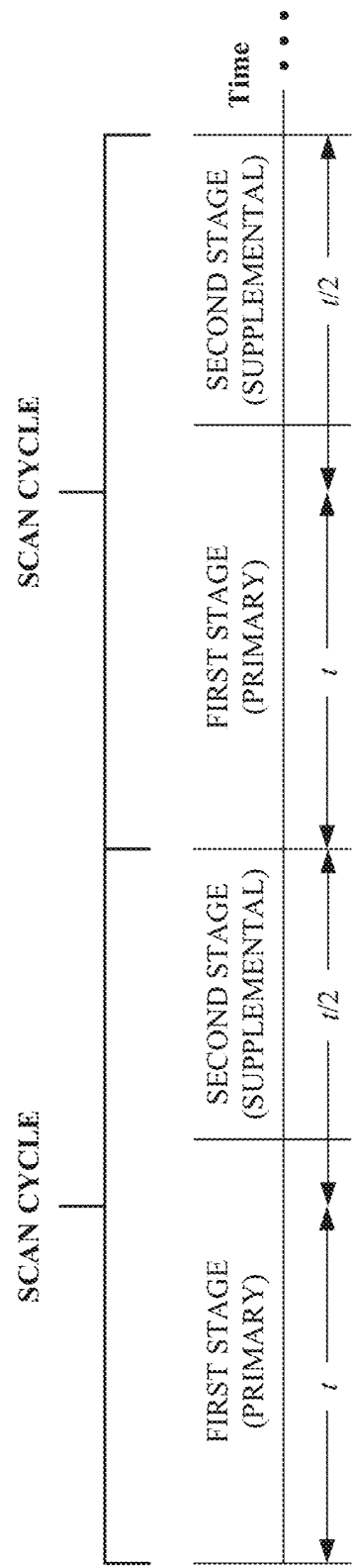

Safety scanner system 302 can be configured to alternate the first and second stages of the scan cycle according to a defined period. FIGS. 11A and 11B are timing charts illustrating two example scan cycles for alternating between emission of light beam 412 during the first stage and emission of second light 802 during the second stage. In some embodiments, the first and second stages can be configured to execute for substantially equal durations t, as illustrated in FIG. 11A. In other embodiments, the first stage may be configured to execute for a longer duration than the second stage. In such embodiments, the first stage of the scan cycle may be the primary means of object detection, while the second stage can execute periodically in order to verify that there are no objects in front of the receiver array component 308 that may be preventing detection of objects during the first stage. FIG. 11B illustrates an example in which the duration t/2 of the second stage is approximately half as long as the duration t of the first stage. It is to be appreciated that other timings for alternating between the first and second stages of the scan cycle are also within the scope of one or more embodiments.

Returning now to FIG. 9, in some embodiments hazard analysis and decision component 314 can allow a user to define a region of interest within the images 702 and 802, such that a safety action is only initiated if a potential blockage of reflected beam 414 is detected within the defined region of interest. For example, a particular industrial automation application may only require a selected region of image 702 to be monitored for presence of people or vehicles (under the assumption that other regions of the image correspond to safe areas within which people or vehicles may enter). Accordingly, safety scanner system 302 may include configuration tools—such as a graphical interface component that renders user interface screens on a client device connected to the safety scanner system 302—that allow the user to define one or more regions of image 702 within which the presence of a detected person or object will cause hazard analysis and decision component 314 to initiate the safety output. In various embodiments, user interface screens generated by safety scanner system 302 can allow the user to define the regions of interest by entering x-y coordinates for the region (in addition to the z-axis distance information defining the minimum safe distance), or can allow the user to define the regions of interest by tracing the regions using a drawing tool (e.g., a cursor).

Figure 12:
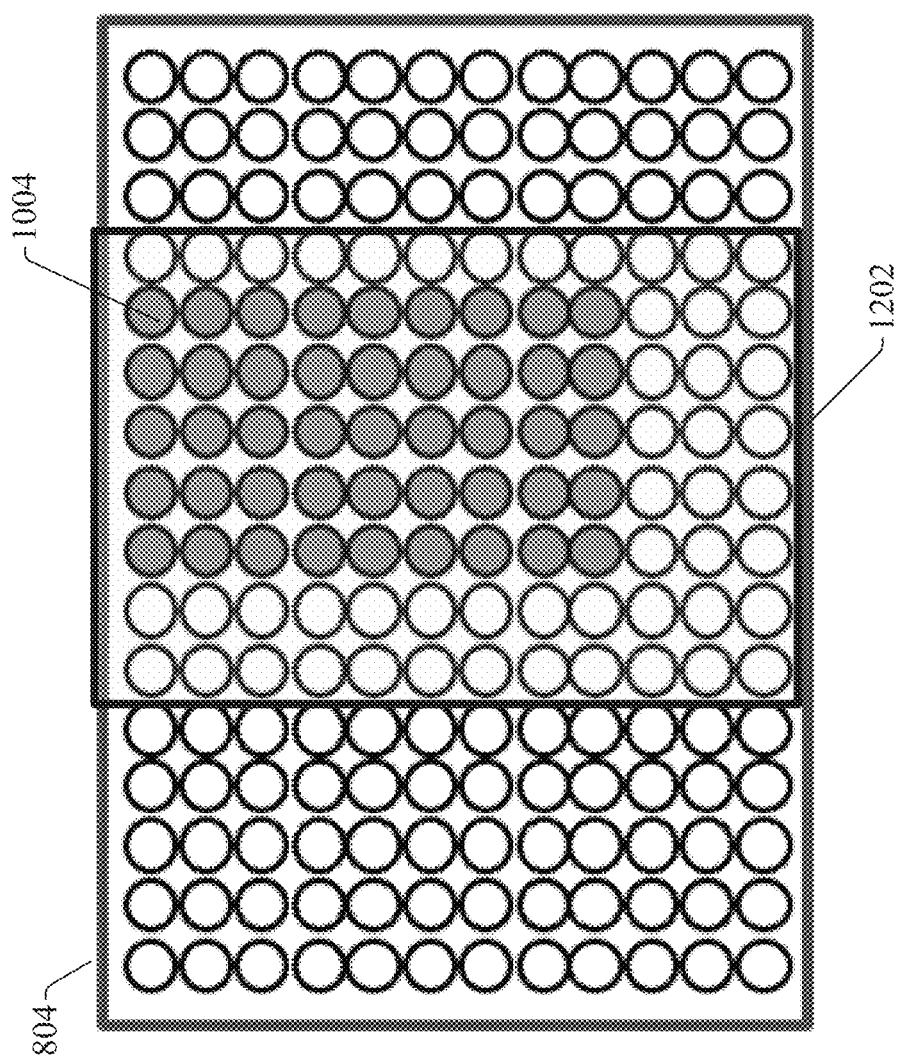
FIG. 12 is a view of a light image with an example region of interest highlighted.

FIG. 12 is a view of second light image 804 with an example region of interest 1202 highlighted (the defined region of interest 1202 will typically be applied to both second stage image 804 and first stage image 702). The region of interest 1202 defines a subset of pixels that will cause a safety output to be generated if any of the subset of pixels (e.g., pixels 1004) are determined to correspond to reflected second light 802 during the second stage of the scan cycle. Since regions outside of the region of interest 1202 are not considered to be hazardous areas, detection of an object outside of the region of interest 1202 during the first or second stages of the scan cycle will not cause the hazard analysis and decision component 314 to initiate a safety action or a fault indication.

In some embodiments, rather than emitting light beam 412 and second light 802 in an alternating manner, as depicted in FIGS. 11A and 11B, safety scanner system 302 can emit light from both sources simultaneously using different wavelengths or pulse modulation patterns. For example, light source component 304 can be configured to emit light according at a first wavelength or modulated with a first pulse pattern, while supplemental illumination component 306 can be configured to emit light at a second wavelength or modulated with a second pulse pattern that differs from the first pulse pattern. Receiver array component 308 can then differentiate between the two types of light based on the respective wavelengths or pulse patterns, and process both images 702 and 804 simultaneously. In an example of such an embodiment, receiver array component 308 can include filters that separate received first light from light source component 304 and received second light from supplemental illumination component 306, and directs these two types of reflected light to respective two receiver arrays 408. Distance determination component 310 and hazard analysis and decision component 314 can then perform analysis on both images 702 and 804 simultaneously without the need to alternate between the two illumination and analysis types.

Although examples described above have described light beam 412 as being a planar beam projected substantially parallel to the floor, in some embodiments light source component 304 can be configured to scan this planar beam vertically (in the y-axis direction) to yield a three-dimensional monitoring field. In such embodiments, primary light image 702 can yield depth map data for the viewing field that can be correlated with the second light image 804 in order to detect and identify objects and their distances within the viewing field, as well as to determine whether an intrusive object (such as workpiece 416) is preventing detection of a person, vehicle, or other critical object.

In examples described above, it has been assumed that hazard analysis and decision component 314 performs 2D (imaging) analysis of the second light image 804 in order to identify the presence of shapes presumed to correspond to objects that may be blocking receiver array component 208. However, in some embodiments safety scanner system 302 can be configured to perform 3D analysis on the second image 804—rather than imaging analysis—in order to supplement the triangulation-based distance analysis performed on primary light image 702. In an example of such an embodiment, supplemental illumination component 306 can be configured to emit a second laser or LED beam that oscillates in the x-axis and y-axis directions (or a wide flat beam that oscillates in the y-axis direction), and distance determination component 310 can perform triangulation analysis on the reflected supplemental light in order to obtain a depth map for the hazardous area in front of safety scanner system 302. In another example embodiment, supplemental illumination component can be configured to emit a wide beam of pulsed light, and distance determination component 310 can be configured to perform time-of-flight analysis on the reflected pulsed light received at receiver array 408 in order to obtain the depth map data for the viewing area. Once the supplemental depth map of the hazardous area is obtained, hazard analysis and decision component 314 can analyze the depth map data to detect presence of objects that may be blocking receiver array component 308 and preventing detection of people or objects by the light source component 304.

Performing 3D analysis on the second image 804 during the second (supplemental) stage of the scan cycle may prevent improper fault detections in some scenarios by determining whether an object detected by the second light 802 is within the defined minimum safe distance from the safety scanner system 302. For example, if 3D analysis performed during the second stage determines that an object is present within the viewing field (and is located within the region of interest if such a region has been defined by the user), the hazard analysis and decision component 314 can determine whether the distance of the object from the safety scanner system 302 is less than the defined minimum safe distance. If the distance is greater than the minimum safe distance, hazard analysis and decision component 314 will not generate a fault indication. Instead, hazard analysis and decision component 314 will only generate the fault indication if the distance of the detected object is less than the minimum safe distance and the first stage of the scan cycle reveals no object (suggesting that an intrusive object may be blocking reflected beam 414 and preventing detection of objects by light beam 412).

Performing 3D analysis on the second image 804 can also provide a redundant distance measurement that verifies the accuracy of the distance measurement obtained during the first stage of the scan cycle via triangulation of light beam 412. For example, if an object is detected within the same area in both the first image 702 and second image 804—indicating that the objects identified in both images correspond to the same object—hazard analysis and decision component 314 can compare the distance information obtained by triangulating light beam 412 during the first stage of the scan cycle (via analysis of the first image 702) and the distance information obtained via 3D analysis of the second image 804 (which may also be based on triangulation, or may be obtained using a different distance calculation technique, such as time-of-flight analysis). If both distance measurements are substantially equal within a defined tolerance, safety scanner system 302 assumes that the triangulation measurement is accurate. Alternatively, if the distance measurement deviates from each other in excess of the defined tolerance, safety scanner system 302 can output a safety output to place the monitored industrial machine or process in a safe state and generate a fault message indicating that the scanner's distance measurements are inaccurate.

In some embodiments, in addition to detection of presence and distances of objects within the hazardous area, hazard analysis and decision component 314 can also be configured to classify detected objects based on a correlation between the first and second stage analysis results. For example, if an object is detected in the same space within both the first image 702 as a result of performing triangulation analysis on reflected light beam 414 and the second image 804 as a result of either imaging or 3D analysis of the reflected second light 802, hazard analysis and decision component 314 can infer that the objects detected in both images correspond to the same object. Since the second image 804 yields shape information for the object due to the wide beam of second light 802 emitted into the viewing field, hazard analysis and decision component 314 can be trained to recognized different types of objects based on learned shapes or patterns so that safety scanner system 302 can perform suitable responses in accordance with the object type.

In an example application, hazard analysis and decision component 314 can be trained to distinguish between vehicles (e.g., forklifts or small trucks) and humans based on object shape information obtained as a result of performing imaging (2D) analysis on the second image 804. In response to detecting a recognizable shape within second image 804 and a corresponding object in the first (primary) image 702 within the same scan cycle, hazard analysis and decision component 314 can classify the shape discovered in the second image 804 as either a human or a vehicle, and combine this classification information with the distance information obtained via triangulation analysis performed on the first image 702. Thus, hazard analysis and decision component 314 generates both classification and distance information for the detected object, and can perform a suitable action based on this combined information.

In general, embodiments of safety scanner system 302 that support classification of objects can be configured to perform different actions for respective different object classifications. In an example application, hazard analysis and decision component 314 can be configured to allow objects classified as vehicles to enter the hazardous area without placing the industrial machine or process in a safe state, and to place the machine or process in the safe state if the detected object is classified as a human. In another example implementation, one or more embodiments of safety scanner system 302 can allow the user to define different minimum safe distances for respective different object classifications. For example, a user may instruct safety scanner system 302 (via suitable graphical configuration screens generated by the scanner system 302) that the minimum safe distance for humans is ten meters, while the minimum safe distance for vehicles is five meters. Accordingly, during operation, hazard analysis and decision component 312 will determine a classification for a detected object based on imaging analysis of the second image 804 during the second stage of the scan cycle, and compare the corresponding distance information obtained during the first stage of the scan cycle with the defined minimum safe distance for the identified classification. Hazard analysis and decision component 314 will then only initiate a safe mode for the machine or process if the distance measured during the first stage is less than the minimum safe distance defined for the identified classification.

In some embodiments, hazard analysis and decision component 314 can also be configured to perform auxiliary actions based on the classification of a detected object. For example, hazard analysis and decision component 314 can be configured to distinguish between humans and vehicles, and to initiate a control action in response to detection of one of these two classifications but not the other classification. In an example application, if the detected object is classified as a vehicle, hazard analysis and decision component 314 may be configured to send a control output (e.g., via interface component 318) to an automatic door that causes the door to open and allow the vehicle to enter a protected area, while detection of an object classified as a person will not cause the control output to be sent.

Figure 13:
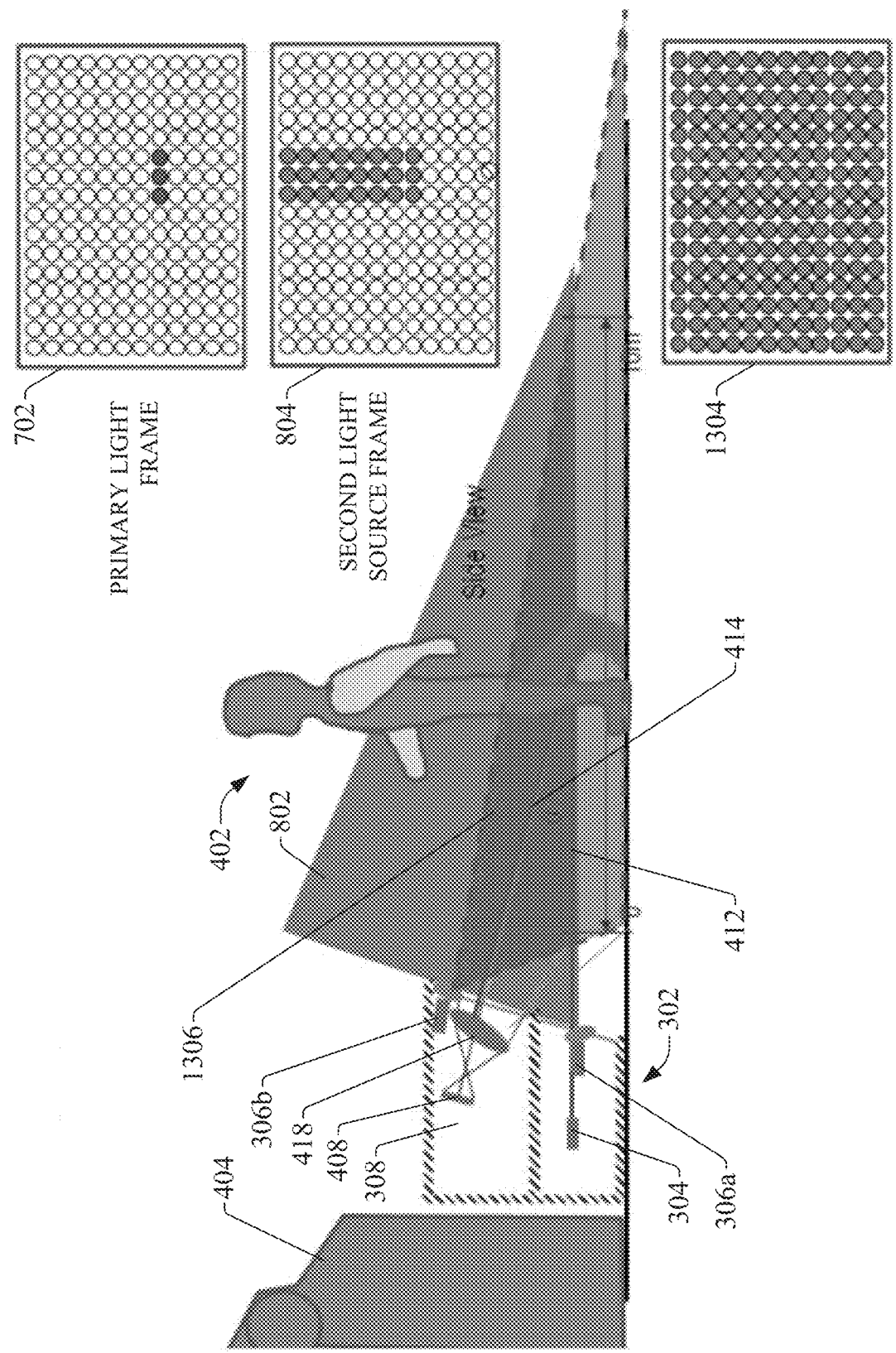
FIG. 13 is a diagram of an example embodiment of a safety scanner system that incorporates a second supplemental illumination component that serves as a third light source.

FIG. 13 is a diagram of another example embodiment of safety scanner system 302 that incorporates a second supplemental illumination component 306*b*, which serves as a third light source. In this embodiment, in addition to the light source component 304 and a first supplemental illumination component 306*a* (which is similar to supplemental illumination component 306 described above), safety scanner system 302 includes a second supplemental illumination component 306*b* oriented to project third light 1306 toward the floor in front of robot 404. Second supplemental illumination component 306*b* is oriented such that the illumination field created by third light 1306 encompasses the desired depth of field (in the illustrated example, a ten meter distance from a point near the front of safety scanner system 302).

Similar to embodiments described above that use two light sources, receiver array component 308 can control the three light sources such that safety scanner system 302 alternates between emission of light by the three light sources. This results in a three-stage scan cycle, whereby primary image 702 is produced during the first stage based on light beam 412, second image 804 is produced during the second stage based on second light 802, and a third image 1304 is produced during the third stage based on third light 1306 emitted by second supplemental illumination component 306*b*.

The third light 1306 can be used by safety scanner system 302 to confirm that there are no excessively reflective surfaces that may be diverting light away from lens 418 of receiver array component 308. In this regard, third image 1304 can provide a background reference used to detect possible specular light diversion due to presence of mirror-like reflective surfaces within the viewing field. If hazard analysis and decision component 314 detects presence of a mirror-like object within image 1306 during the third stage of the scan cycle, a control output can be generated that places the controlled industrial machine or process (e.g., robot 404) into a safe state, and a fault message can be generated indicating that conditions within the viewing field may be rendering object detection by safety scanner system 302 unreliable.

Figure 14:
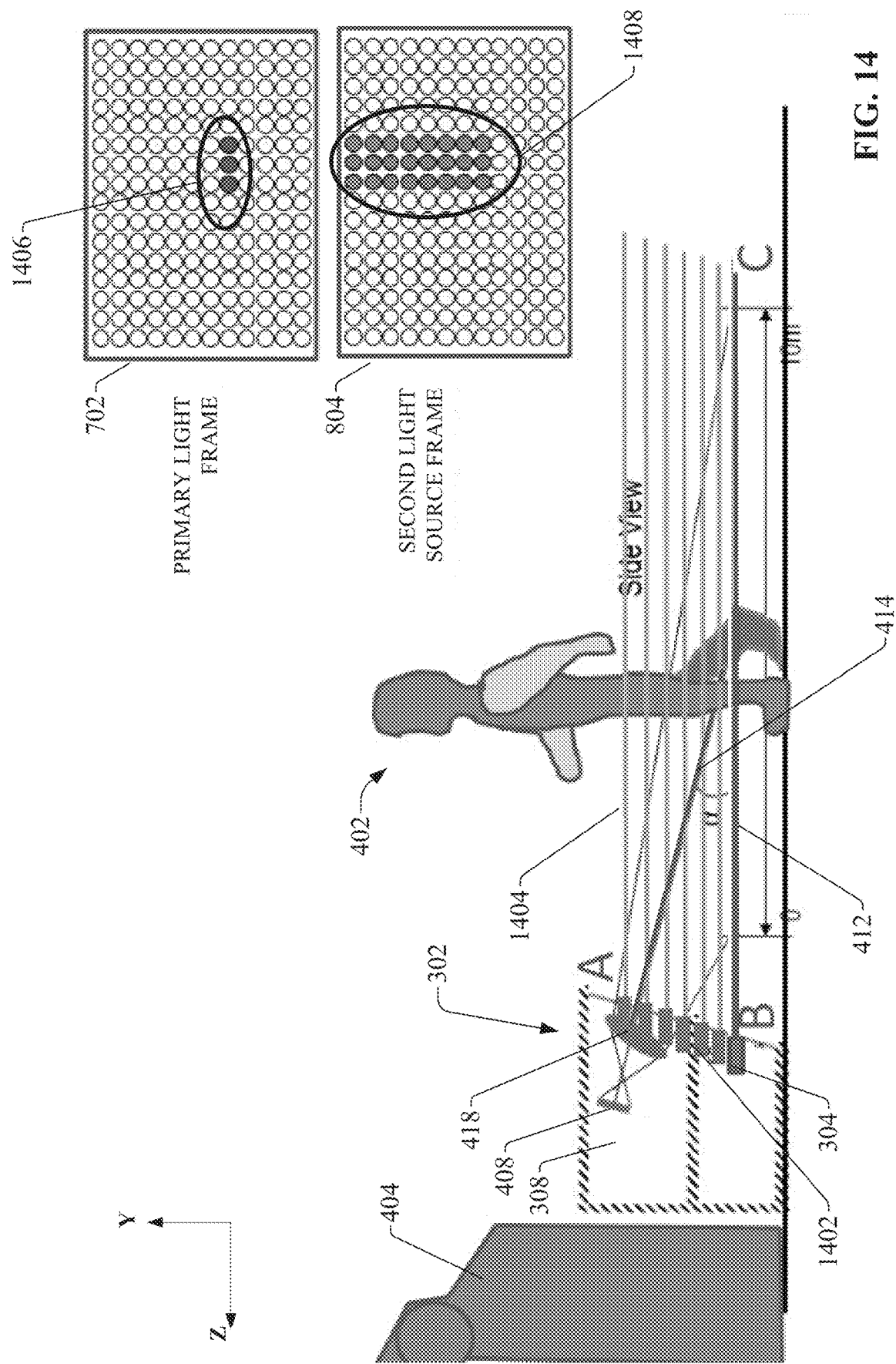
FIG. 14 is a diagram of an embodiment of a safety scanner system in which a single supplemental illumination component has been replaced with multiple supplemental illumination sources.

FIG. 14 is a diagram of another embodiment of safety scanner system 302 in which a single supplemental illumination component 306 has been replaced with multiple supplemental illumination sources 1402. Supplemental illumination sources 1402 may be, for example, an array of fish-tailed LEDs that project supplemental light beams 1404 into the viewing field substantially parallel to the floor. Supplemental illumination sources 1402 may emit individual wide flat beams 1404, or may emit narrow beams that scan or oscillate in the x-axis direction, creating a series of stacked monitoring planes within the viewing field.

In this example embodiment, distance determination component 310 can detect an object within the viewing field based on reflected beam 414 received at the receiver array 408 from light source component 304, producing primary light image 702. In the illustrated example, the user's legs are detected during the first stage of the scan cycle as a row of receiver array pixels 1406 struck by reflected beam 414, as in previous examples. In addition, reflected light from beams 1404 received at receiver array 408 during the second stage of the scan cycle can produce second image 804, which can be analyzed to either confirm presence of the person 402 detected in the primary light image 702 or to detect presence of an intrusive object that may be preventing reflected beam 414 from reaching the receiver array 408. In the illustrated example, the group of pixels 1408 in second image 804 that detect reflected light from beams 1404 are identified as corresponding to the person 402 detected in the primary light image 702. Since the person is detected in both the first and second images, robot 404 is placed in the safe state in response to detection of person 402 in the hazardous area, but no fault indication is generated since the object represented by pixels 1408 is not assumed to be an intrusive object that prevents detection of a person or vehicle. Instead, pixels 1408 are assumed to correspond to the object detected in the first image 702.

In a variation of the embodiment depicted in FIG. 14, the second stage analysis can also involve performing 3D distance measurements based on the reflected light from beams 1404, such that distance information is obtained from both the first and second images. In this way, any object intruding within the volume defined by lines A, B, and C (extending in the x-axis direction) can be detected and measured.

The use of two or more illumination sources to generate alternating frames that measure different aspects of the viewing field can render embodiments of safety scanner system 302 more robust and reliable relative to optical scanners that use rely on a single light source. Moreover, by leveraging the Scheimpflug principle by angling lens 418 and receiver array 408 in a manner that extends the depth of field, safety scanner system 302 can increase the distance within which objects can be reliably detected and measured while maintaining a small device size. The increased detection reliability and distance afforded by these aspects of can render the safety scanner system 302 described herein suitable for safety applications, which require a high degree of safety integrity in order to mitigate risk of injuries.

Figure 15:
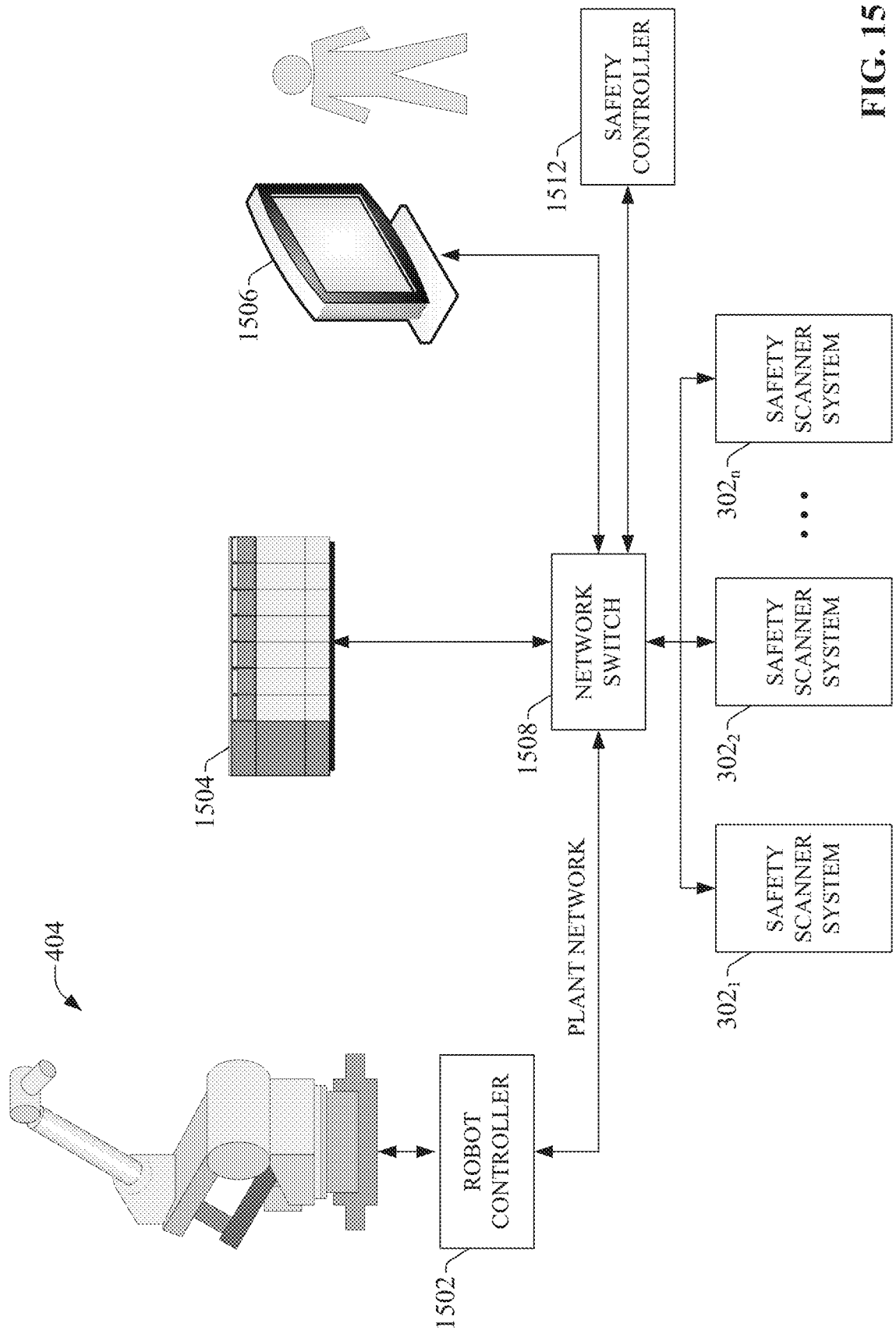
FIG. 15 is an example architecture of an integrated control and safety system that utilizes one or more embodiments of a safety scanner system.

FIG. 15 is an example architecture of an integrated control and safety system that utilizes one or more embodiments of the safety scanner system 302 described above. In this example scenario, an industrial robot 404 or other type of industrial machine or system operates under the control and supervision of industrial controller 1504 (e.g., a programmable logic controller or other type of industrial automation controller). Although the industrial system is depicted in FIG. 15 as comprising a robot 404, other types of controlled industrial systems may also be used within this architecture, including but not limited to a motion system, a palletizing system, a stamping press, or other types of hazardous industrial systems. Robot 404 may operate under direct control of robot controller 1502, which controls the robot 404 in accordance with instructions and information provided by industrial controller 1504. Alternatively, industrial controller 1504 may interface directly with the robot's I/O and control the robot directly.

The architecture may also include a human-machine interface (HMI) device 1506 that visualizes status, operational, and production data to an operator via one or more graphical screens. HMI 1506 may also allow an operator to issue limited control instructions to the control system or set values for one or more parameters (e.g., setpoint values) via the graphical screens.

One or more safety scanner systems 302 are configured to monitor one or more hazardous areas near the robot. For configurations in which the safety scanner systems 302 act as stand-alone safety devices, the safety scanner systems 302 are communicatively interfaced with one or both of the industrial controller 1504 and the robot 404 or its associated robot controller 1502 to provided integrated optical safety monitoring and control. Safety scanner systems 302 may also interface with the HMI device 1506 in order to deliver feedback messages or image data to the operator. For example, fault messages generated by hazard analysis and decision component 314 in response to detecting an intrusive object in the second image 804 that might be preventing accurate detection of objects in the primary light image 702 can be sent by the safety scanner system 302 to HMI device 1506 and rendered on an appropriate alarm screen. Alternatively, safety scanner device 302 may interface with a separate safety controller 1512, which can respond to indications from safety scanner system 302 that an object has been detected within a monitored hazardous zone, or that a condition within a hazardous zone may be causing unreliable object detection within the zone. In response to such indications, safety controller 1512 may disconnect power to one or more moving components of robot 404 in order to place the robot 404 in a safe state.

In yet another configuration, one or more of the safety scanner system components can reside on the safety controller 1512. For example, light source component 304, supplemental illumination component 306, receiver array component 308, and distance determination component 310 may reside in a first device oriented to illuminate and monitor a hazardous zone, while hazard analysis and decision component 312 may reside on safety controller 1512, which initiates safety actions and messaging based on information generated by the illumination and image processing components on the monitoring device. In some scenarios in which multiple safety scanner systems $302_1$-$302_n$ are configured to monitor respective hazardous areas, safety controller 1512 may aggregate imaging and point cloud data from the safety scanner systems 302 and perform one or more of object detection, object classification, object tracking, decision-making, and safety response based on the aggregated data. The industrial controller 1504, robot controller 1502, HMI device 1506, safety scanner system(s) 302, and safety controller 1512 may all reside on a plant network or safety network; e.g., via one or more network switches 1508. Alternatively, safety scanner system(s) 302 and/or safety controller 1512 may interface directly with one or both of the industrial controller 1504 or the robot controller 1502 via the controller's I/O.

FIGS. 16-18 illustrate various methodologies in accordance with one or more embodiments of the subject application. While, for purposes of simplicity of explanation, the one or more methodologies shown herein are shown and described as a series of acts, it is to be understood and appreciated that the subject innovation is not limited by the order of acts, as some acts may, in accordance therewith, occur in a different order and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the innovation. Furthermore, interaction diagram(s) may represent methodologies, or methods, in accordance with the subject disclosure when disparate entities enact disparate portions of the methodologies. Further yet, two or more of the disclosed example methods can be implemented in combination with each other, to accomplish one or more features or advantages described herein.

Figure 16A:
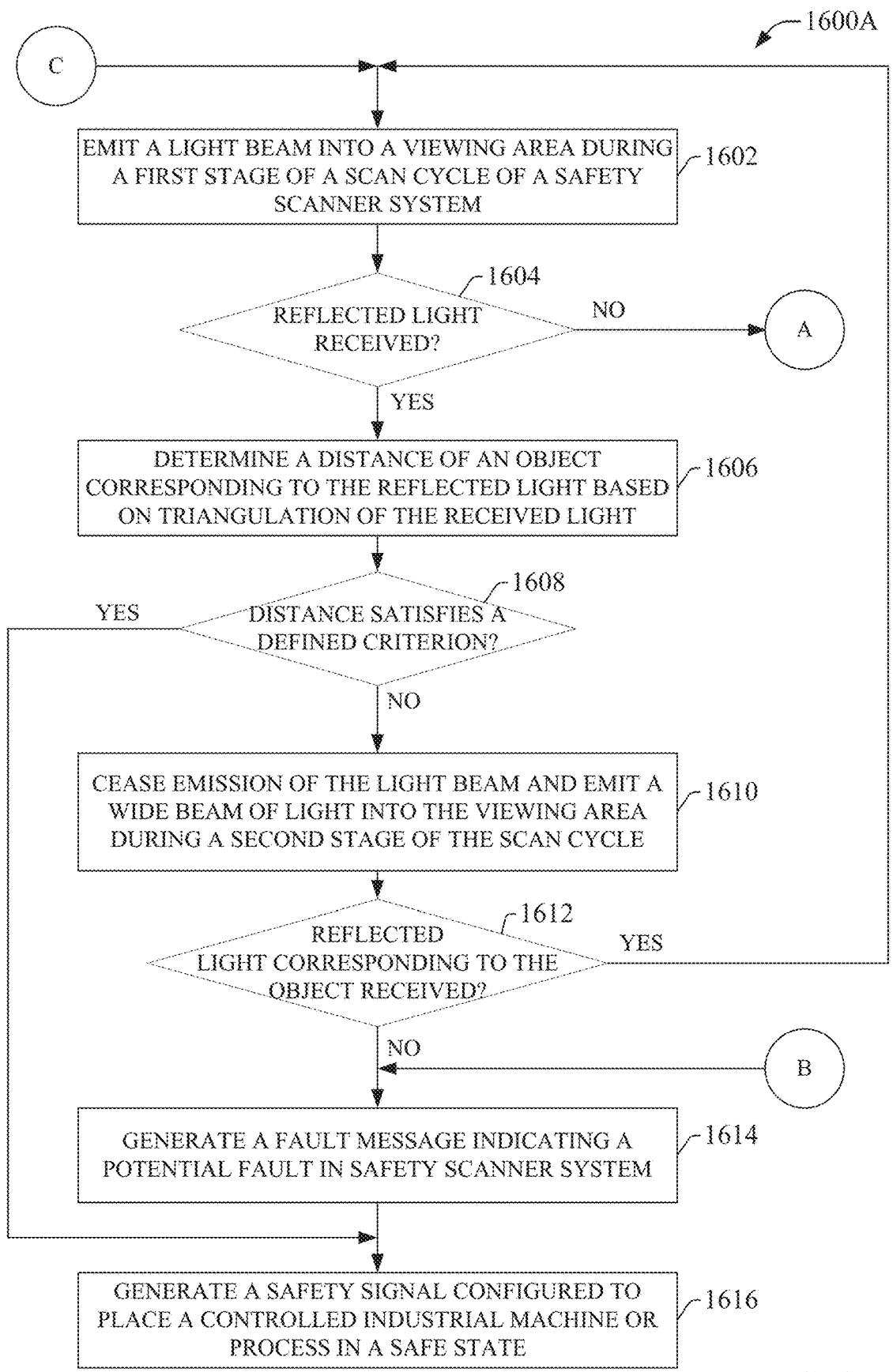
FIG. 16A is a flowchart of a first part of an example methodology for reliably detecting objects within a hazardous industrial area using an optical safety scanner system.

FIG. 16A illustrates a first part of an example methodology 1600A for reliably detecting objects within a hazardous industrial area using an optical safety scanner system. Initially, at 1602, a light beam is emitted into a viewing area by the safety scanner system during a first stage of a scan cycle. The light beam can be, for example, a laser beam or LED light used by the safety scanner system to triangulate the distances of objects within the viewing area. In various embodiments, the safety scanner system emit a wide flat beam or may oscillate a narrow beam along an axis to yield a viewing plane that is substantially parallel to the floor and that detects the presence and distance of objects at a prescribed elevation from the floor. At 1604, a determination is made as to whether a portion of the light emitted at step 1602 is reflected and received at a receiver array of the safety scanner system.

If reflected light is received during this first stage of the scan cycle (YES at step 1604), the methodology proceeds to step 1606, where a distance of an object corresponding to the reflected light is determined based on triangulation of the received light. At 1608, a determination is made as to whether the distance determined at step 1606 satisfies a defined criterion. The defined criterion may be, for example, a minimum safe distance from the safety scanner system, which is compared with the distance determined at step 1606. If the distance satisfies the defined criterion (YES at step 1608), which indicates that the object is closer than a minimum safe distance, the methodology proceeds to step 1616, where a safety signal is generated that is configured to place a controlled industrial machine or process in a safe state (e.g., by disconnecting power from one or more movable components, placing the machine or process in a slow motion or no-motion mode, etc.).

If the distance does not satisfy the defined criterion (NO at step 1608), the methodology proceeds to step 1610, where emission of the light beam emitted during the first stage of the scan cycle at step 1602 is ceased and a wide beam of light is emitted into the viewing area during a second stage of the scan cycle. The illumination source for the wide beam of light can be oriented such that the wide beam of light illuminates a space that encompasses the line or plane monitored by the primary beam emitted during the first stage. At 1612, a determination is made as to whether a portion of the wide beam of light is received at the safety scanner system as reflected light corresponding to the object. If the reflected light corresponding to the object is received (YES at step 1612), which confirms presence of the object detected at step 1606, the methodology returns to step 1602 and the methodology repeats. Alternatively, if reflected light corresponding to the object is not received (NO at step 1612), indicating an inconsistency between results of the first and second stages of the scan cycle, the methodology proceeds to step 1614, where a fault message is generated indicating a potential fault in the safety scanner system. The methodology also proceeds to step 1616, where the safety signal is generated to place the controlled industrial machine or process in the safe state.

Figure 16B:
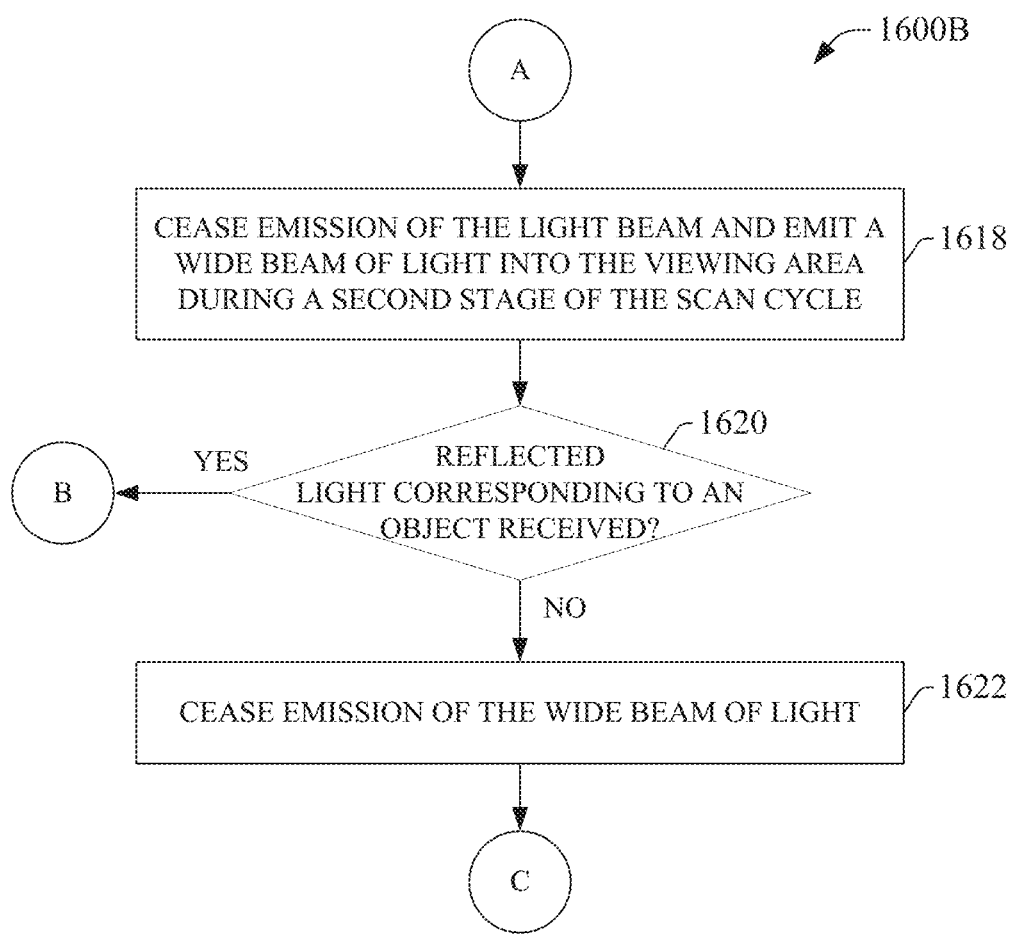
FIG. 16B is a flowchart of a second part of the example methodology for reliably detecting objects within a hazardous industrial area using an optical safety scanner system.

Returning to step 1604, if reflected light from the beam emitted at step 1602 is not received during the first stage of the scan cycle (NO at step 1604), the methodology proceeds to step 1618 of the second part of the example methodology 1600B illustrated in FIG. 16B. At step 1618, emission of the light beam is ceased and a wide beam of light is emitted into the viewing area during the second stage of the scan cycle (similar to step 1610). At 1620, a determination is made as to whether a portion of the wide beam of light is received at the safety scanner system as reflected light. In an example embodiment, the determination can be based on imaging analysis performed on frames of an image generated by the receiver array of the safety scanner system. If no reflected light is received (NO at step 1620), indicating that there are no detected objects entering the monitored area and no intrusive objects are preventing accurate object detection, emission of the wide beam of light is ceased at step 1622, and the methodology returns to step 1602 to begin the next scan cycle. Alternatively, if reflected light corresponding to an object is detected (YES at step 1620), indicating that an intrusive object may be preventing detection of an object by the beam emitted in step 1602 during the first stage, the methodology proceeds to step 1614, where the fault message indicating a potential fault in the safety scanner system is generated. The methodology also proceeds to step 1616, where the safety signal is generated to place the controlled industrial machine or process in the safe state.

Figure 17A:
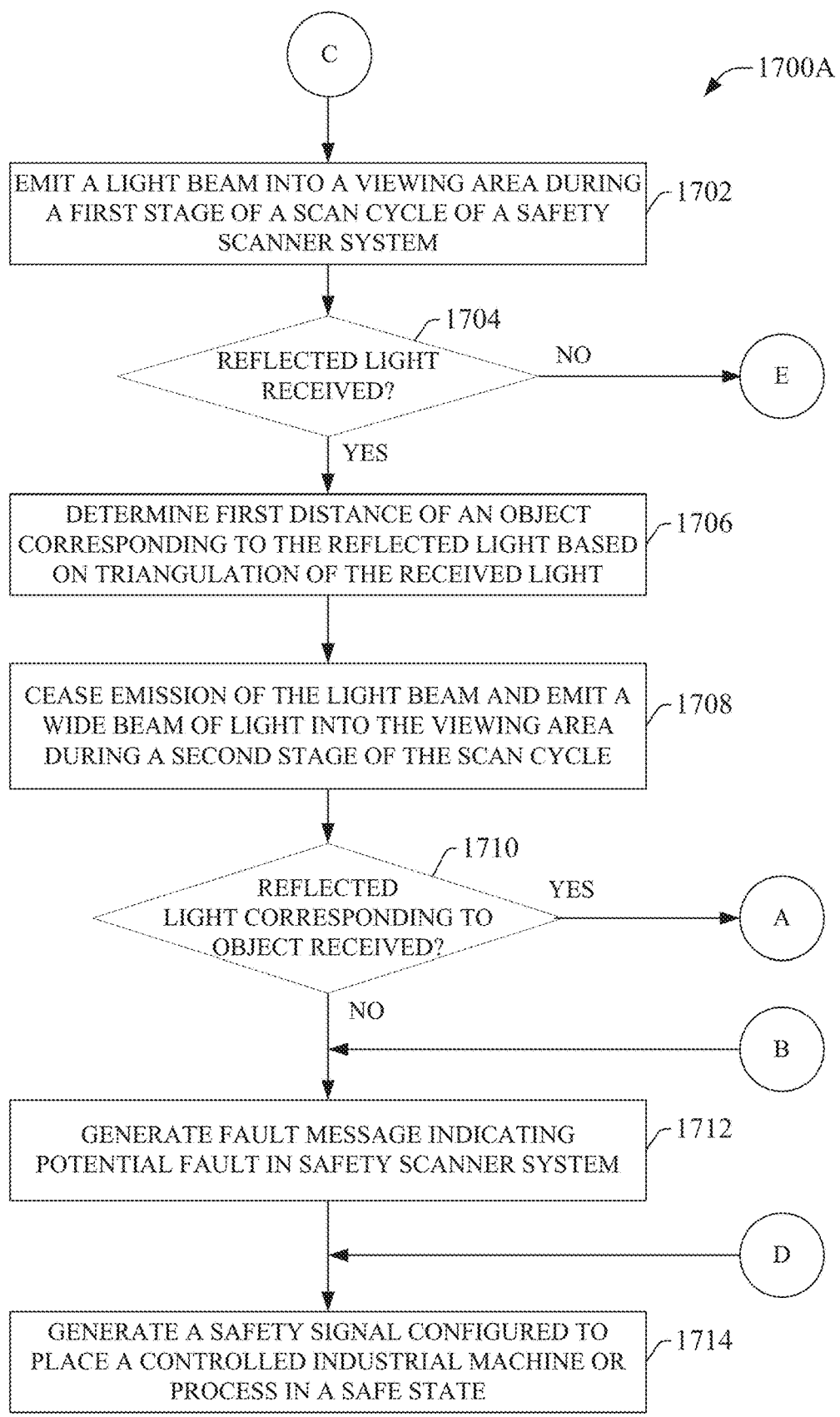
FIG. 17A is a flowchart of a first part of an example methodology for validating distance information measured for an object by an optical safety scanner system.

FIG. 17A illustrates a first part of an example methodology 1700A for validating distance information measured for an object by an optical safety scanner system. Initially, at 1702, a light beam is emitted into a viewing area during a first stage of a scan cycle of a safety scanner system. The light beam can be similar to that described above in connection with step 1602 of methodology 1600A. At 1704, a determination is made as to whether a portion of the light emitted at step 1702 is reflected and received at a receiver array of the safety scanner system.

If reflected light is received during the first stage (YES at step 1704), the methodology proceeds to step 1706, where a first distance of an object corresponding to the reflected light is determined based on triangulation of the received light. At 1708, emission of the light beam emitted at step 1702 is ceased and a wide beam of light is emitted into the viewing area during a second stage of the scan cycle. In one or more embodiments, the wide beam of light may be a pulsed light beam on which time-of-flight analysis can be performed.

At 1710, a determination is made as to whether a portion of the wide beam of light emitted at step 1708 is reflected by the object measured at step 1706 and received at the safety scanner system. If no reflected light corresponding to the object is received (NO at step 1710), indicating a discrepancy between the first stage analysis and the second stage analysis, the methodology proceeds to step 1712, where a fault message is generated indicating a potential fault in the safety scanner system. The methodology also proceeds to step 1714, where a safety signal is generated that is configured to place a controlled industrial machine or process in a safe state.

Figure 17B:
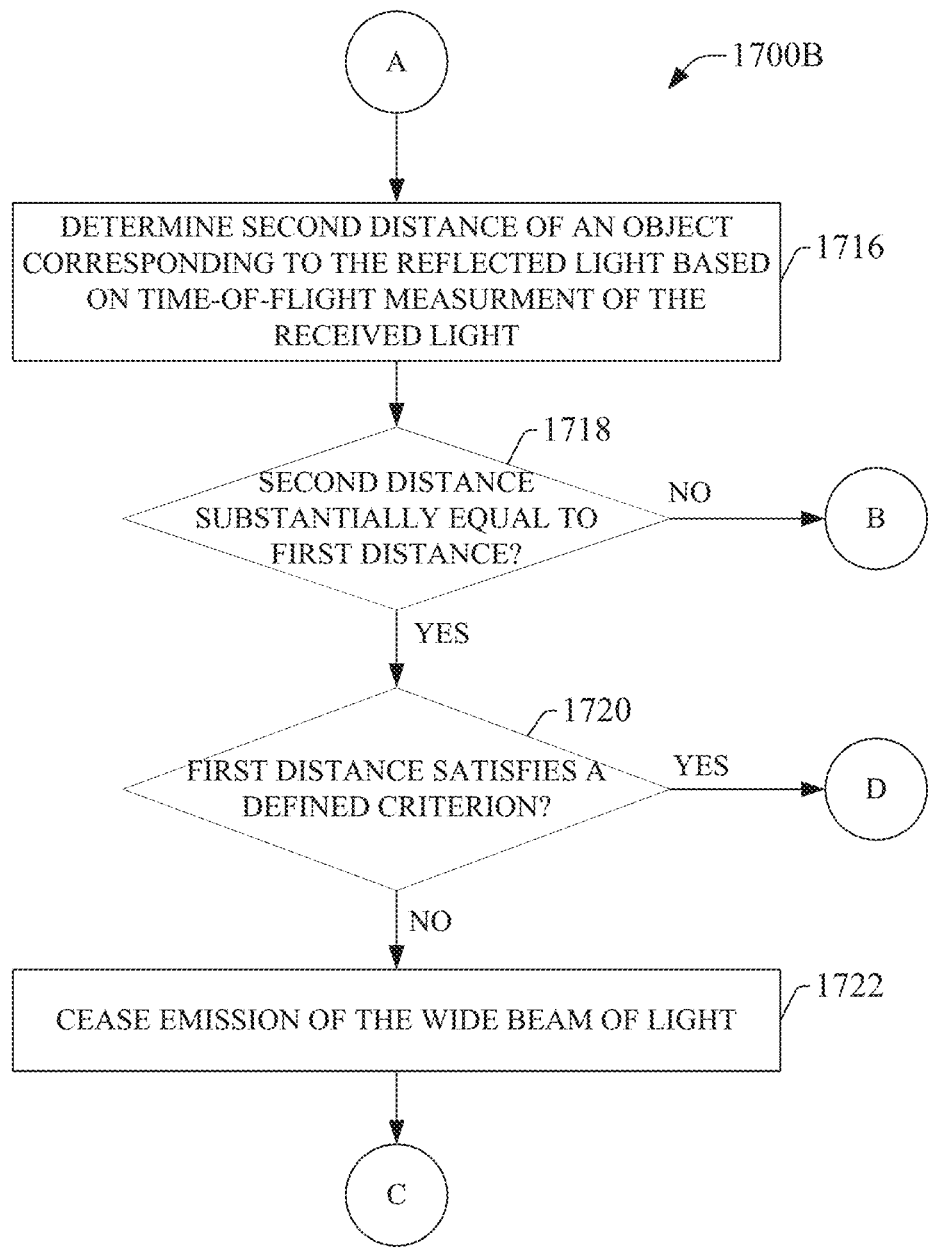
FIG. 17B is a flowchart of a second part of the example methodology for validating distance information measured for an object by an optical safety scanner system.

Returning to step 1710, if reflected light is received during the second stage (YES at step 1710), the methodology proceeds to step 1716 of the second part of the example methodology 1700B illustrated in FIG. 17B. At 1716, a second distance of the object corresponding to the reflected light is determined based on time-of-flight measurement of the received light. At 1718, a determination is made as to whether the second distance determined at step 1716 is substantially equal to the first distance determined at step 1706 within a defined tolerance. If the second distance is not substantially equal to the first distance (NO at step 1718), the methodology proceeds to steps 1712 and 1714, where the fault message and safety signal are generated. Alternatively, if the second distance is substantially equal to the first distance (YES at step 1718), the methodology proceeds to step, where a determination is made as to whether the first distance satisfies a defined criterion. The defined criterion may be, for example, a minimum safe distance from the safety scanner system, which can be compared to the first distance. If the first distance does not satisfy the defined criterion (NO at step 1720), the methodology proceeds to step 1722, where emission of the wide beam of light emitted at step 1708 is ceased, and the methodology returns to step 1702 to begin the next scan cycle. Alternatively, if the first distance satisfies the defined criterion (YES at step 1720), the methodology proceeds to step 1714, where the safety signal is generated to place the controlled industrial process or machine in the safe state.

Figure 17C:
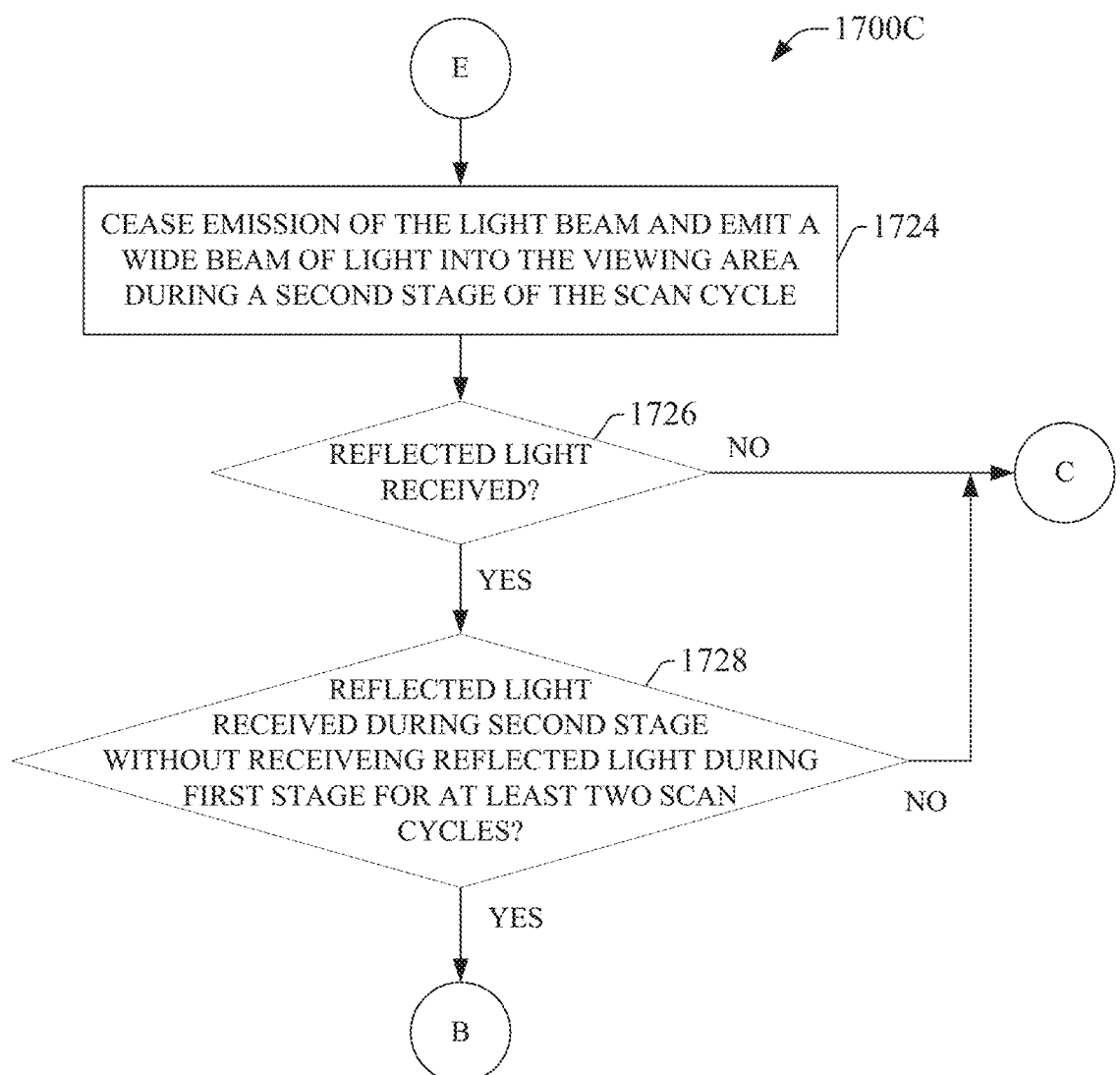
FIG. 17C is a flowchart of a third part of the example methodology for validating distance information measured for an object by an optical safety scanner system.

Returning to step 1704, if no reflected light from the light beam emitted at step 1702 is received during the first stage (NO at step 1704), the methodology proceeds to step 1724 of the third part of the example methodology 1700C illustrated in FIG. 17C. At 1724, emission of the light beam emitted at step 1702 is ceased and the wide beam of light is emitted into the viewing area during the second stage of the scan cycle (similar to step 1708). At 1726, a determination is made as to whether a portion of the wide beam of light emitted at step 1724 is received as reflected light at the safety scanner system. If no reflected light is received (NO at step 1726), indicating agreement between the first and second stages that there are not objects within the monitored viewing area, the methodology returns to step 1702 to begin the next scan cycle. Alternatively, if reflected light is received during the second stage (YES at step 1726), the methodology proceeds to step 1728, where a determination is made as to whether at least two consecutive scan cycles have occurred in which reflected light has been received and detected during the second stage of the scan cycle without receiving reflected light during the first stage. This condition indicates that an intrusive object (e.g., a workpiece or other object) may be preventing reflected light emitted during the first stage from reaching the safety scanner system's receiver array. If at least two scan cycles have not yet passed in which reflected light is detected during the second stage but not during the first stage (NO at step 1728), the methodology returns to step 1702 and the next scan cycle begins. Alternatively, if two or more consecutive scan cycles have passed in which reflected light is detected during the second stage but not during the first stage (YES at step 1728), the methodology proceeds to steps 1712 and 1714, where the fault message and safety signal are generated.

Although the example methodology described in connection with FIGS. 17A-17C considers two consecutive scan cycles to be the threshold for determining presence of an intrusive object, some embodiments may consider other numbers of consecutive scan cycles to be the threshold for determining presence of an intrusive object.

Figure 18A:
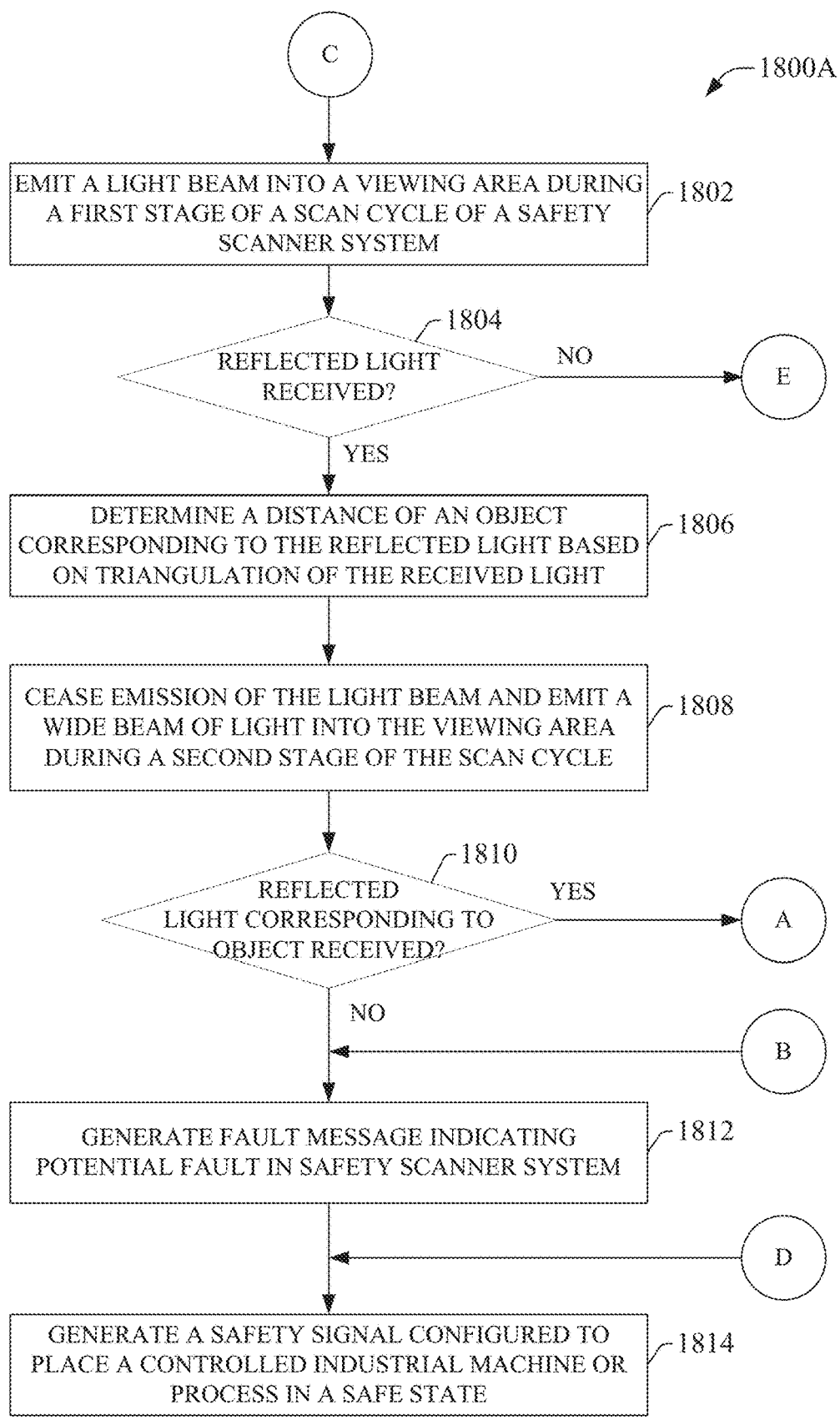
FIG. 18A is a flowchart of a first part of an example methodology for determining and correlating distance and classification information for an object detected by a safety scanner system.

FIG. 18A illustrates a first part of an example methodology 1800A for determining and correlating distance and classification information for an object detected by a safety scanner system. Initially, at 1802, a light beam is emitted into a viewing area during a first stage of a scan cycle of the safety scanner system (similar to steps 1602 and 1702 of methodologies 1600A and 1700A). At 1804, a determination is made as to whether a portion of the light emitted at step 1802 is reflected and received at a receiver array of the safety scanner system. If reflected light is received (YES at step 1804), the methodology proceeds to step 1806, where a distance of an object corresponding to the reflected light is determined based on triangulation of the received light.

At 1808, emission of the light beam emitted at step 1802 is ceased and a wide beam of light is emitted into the viewing area during a second stage of the scan cycle (similar to steps 1610 and 1618 of methodologies 1600A and 1600B). At 1810, a determination is made as to whether a portion of the wide beam of light emitted at step 1808 is received as reflected light corresponding to the object measured at step 1806. If reflected light corresponding to the object is not received (NO at step 1810), indicating a discrepancy between first stage and second stage measurements, the methodology proceeds to step 1812, where a fault message indicating a potential fault in the safety scanner system is generated. The methodology also proceeds to step 1814, were a safety signal configured to place a controlled industrial machine or process in a safe state is generated.

Returning to step 1810, if reflected light corresponding to the object is received during the second stage (YES at step 1810), the methodology proceeds to step 1816 of the second part of the example methodology 1800B. At 1816, a classification of the object corresponding to the reflected light is determined based on imaging analysis of the reflected light. For example, the safety scanner system's receiver array can generate an image based on the reflected light, and identify characteristics of the shape of the object indicative of a defined classification. Example object classifications can include, but are not limited to, a person, a forklift, a truck, a mobile industrial robot, or other such classifications.

At 1818, a determination is made as to whether the classification determined at step 1816 and the distance determined at step 1806 satisfy a criterion. In this regard, safety scanner system may be configured to recognize different minimum safe distances corresponding to respective different object classifications. For example, the safety scanner system may be configured to associate a relatively long minimum safe distance (e.g., none meters) with objects classified as people, and to associated a shorter minimum safe distance (e.g., three meters) with objects classified as forklifts or trucks. Accordingly, the criterion may define that, if the object is classified as a person, the measured distance must be greater than the longer minimum safe distance associated with the person classification, and if the object is classified as a vehicle, the measured distance must be greater than the shorter minimum safe distance associated with the vehicle classification.

If the classification and the distance do not satisfy the criterion (NO at step 1818), the methodology proceeds to step 1820, where emission of the wide beam of light emitted at step 1808 is ceased. The methodology then returns to step 1802 and the next scan cycle begins. Alternatively, if the classification and the distance do satisfy the criterion (YES at step 1818), indicating that an object corresponding to the identified classification is closer than the minimum safe distance defined for that classification, the methodology proceeds to step 1814, where the safety signal is generated to place the controlled industrial machine or process in the safe state.

Returning to step 1804, if no reflected light is received during the first stage of the scan cycle (NO at step 1804), the methodology proceeds to step 1822 of the third part of the example methodology 1800C. At 1822, emission of the light beam emitted at step 1802 is ceased and the wide beam of light is emitted into the viewing area during the second stage of the scan cycle. At 1824, a determination is made as to whether a portion of the wide beam of light emitted at step 1822 is received as reflected light. If no reflected light is received (NO at step 1824), indicating that no objects are detected by either of the first and second stages of the scan cycle, the methodology returns to step 1802 and the next scan cycle begins. Alternatively, if reflected light is received (YES at step 1824), the methodology proceeds to step 1826, where a determination is made as to whether at least two consecutive scan cycles have occurred in which reflected light has been received and detected during the second stage of the scan cycle without receiving reflected light during the first stage. This condition indicates that an intrusive object (e.g., a workpiece or other object) may be preventing reflected light during the first stage from reaching the safety scanner system's receiver array. If at least two scan cycles have not yet passed in which reflected light is detected during the second stage but not during the first stage (NO at step 1826), the methodology returns to step 1802 and the next scan cycle begins. Alternatively, if two or more consecutive scan cycles have passed in which reflected light is detected during the second stage but not during the first stage (YES at step 1826), the methodology proceeds to steps 1812 and 1814, where the fault message and safety signal are generated.

Figure 18B:
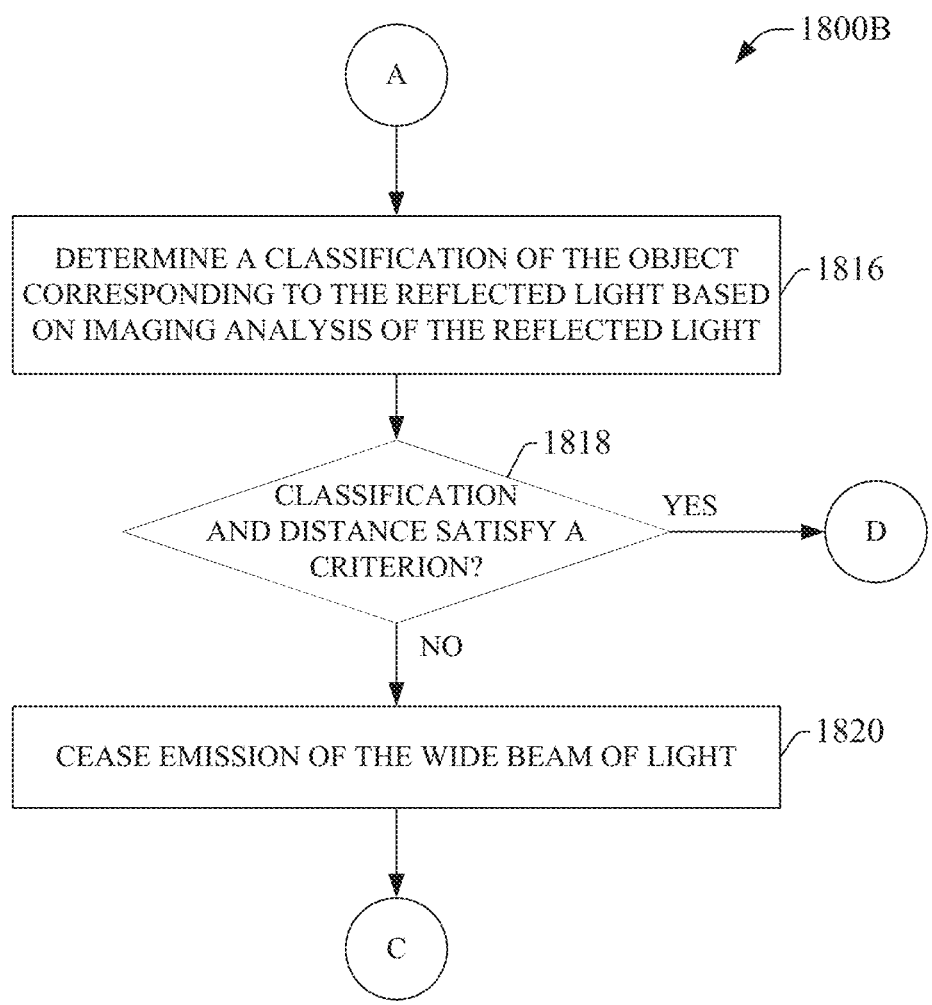
FIG. 18B is a flowchart of a second part of the example methodology for determining and correlating distance and classification information for an object detected by a safety scanner system.
Figure 18C:
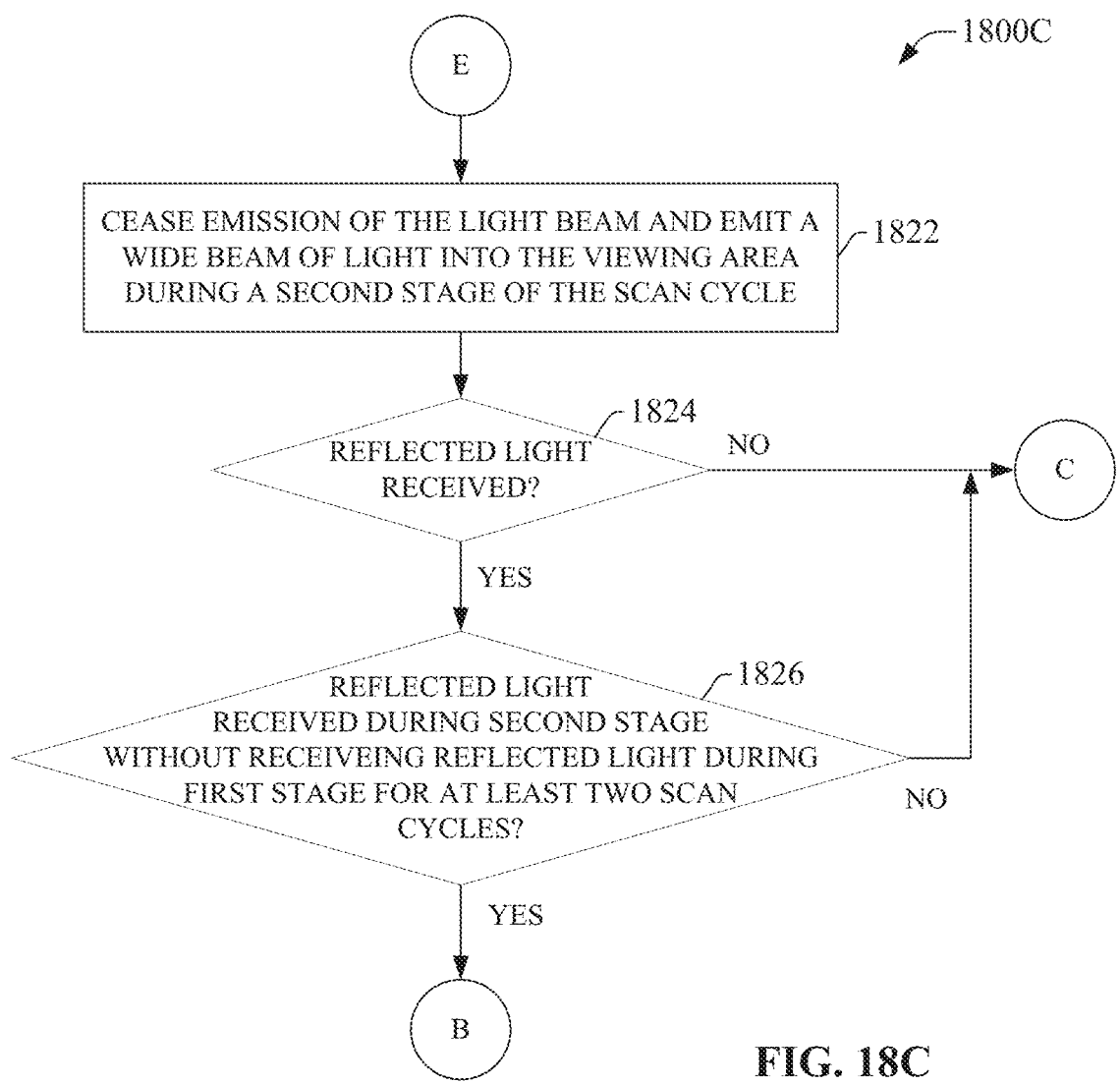
FIG. 18C is a flowchart of a third part of the example methodology for determining and correlating distance and classification information for an object detected by a safety scanner system.

Although the example methodology described in connection with FIGS. 18A-18C considers two consecutive scan cycles to be the threshold for determining presence of an intrusive object, some embodiments may consider other numbers of consecutive scan cycles to be the threshold for determining presence of an intrusive object.

Embodiments, systems, and components described herein, as well as control systems and automation environments in which various aspects set forth in the subject specification can be carried out, can include computer or network components such as servers, clients, programmable logic controllers (PLCs), automation controllers, communications modules, mobile computers, on-board computers for mobile vehicles, wireless components, control components and so forth which are capable of interacting across a network. Computers and servers include one or more processors—electronic integrated circuits that perform logic operations employing electric signals—configured to execute instructions stored in media such as random access memory (RAM), read only memory (ROM), a hard drives, as well as removable memory devices, which can include memory sticks, memory cards, flash drives, external hard drives, and so on.

Similarly, the term PLC or automation controller as used herein can include functionality that can be shared across multiple components, systems, and/or networks. As an example, one or more PLCs or automation controllers can communicate and cooperate with various network devices across the network. This can include substantially any type of control, communications module, computer, Input/Output (I/O) device, sensor, actuator, and human machine interface (HMI) that communicate via the network, which includes control, automation, and/or public networks. The PLC or automation controller can also communicate to and control various other devices such as standard or safety-rated I/O modules including analog, digital, programmed/intelligent I/O modules, other programmable controllers, communications modules, sensors, actuators, output devices, and the like.

The network can include public networks such as the internet, intranets, and automation networks such as control and information protocol (CIP) networks including DeviceNet, ControlNet, safety networks, and Ethernet/IP. Other networks include Ethernet, DH/DH+, Remote I/O, Fieldbus, Modbus, Profibus, CAN, wireless networks, serial protocols, and so forth. In addition, the network devices can include various possibilities (hardware and/or software components). These include components such as switches with virtual local area network (VLAN) capability, LANs, WANs, proxies, gateways, routers, firewalls, virtual private network (VPN) devices, servers, clients, computers, configuration tools, monitoring tools, and/or other devices.

Figure 19:
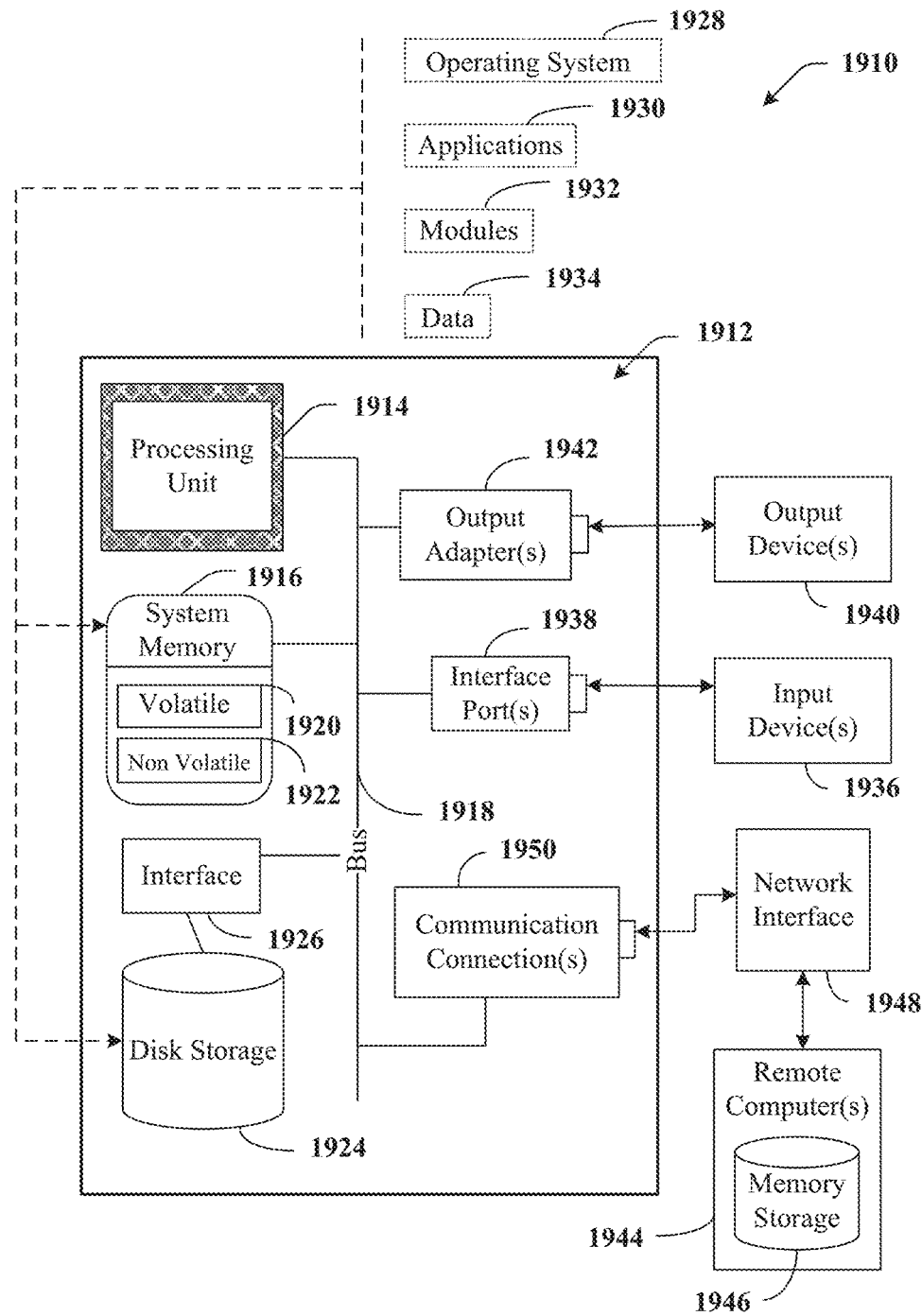
FIG. 19 is an example computing environment.
Figure 20:
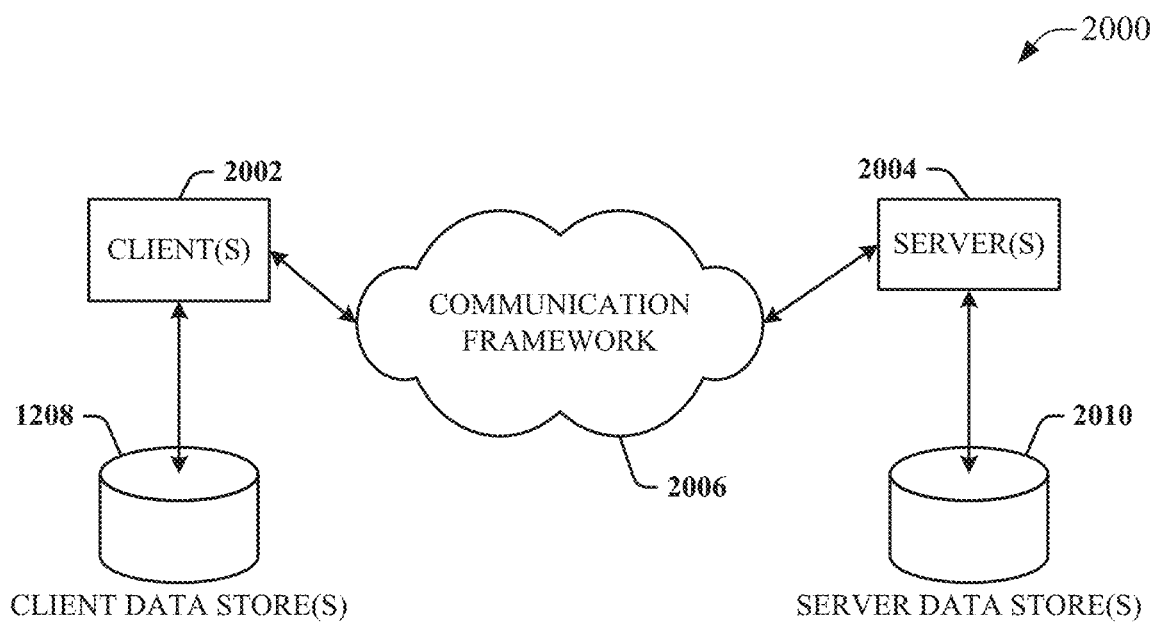
FIG. 20 is an example networking environment.

In order to provide a context for the various aspects of the disclosed subject matter, FIGS. 19 and 20 as well as the following discussion are intended to provide a brief, general description of a suitable environment in which the various aspects of the disclosed subject matter may be implemented.

With reference to FIG. 19, an example environment 1910 for implementing various aspects of the aforementioned subject matter includes a computer 1912. The computer 1912 includes a processing unit 1914, a system memory 1916, and a system bus 1918. The system bus 1918 couples system components including, but not limited to, the system memory 1916 to the processing unit 1914. The processing unit 1914 can be any of various available processors. Multi-core microprocessors and other multiprocessor architectures also can be employed as the processing unit 1914.

The system bus 1918 can be any of several types of bus structure(s) including the memory bus or memory controller, a peripheral bus or external bus, and/or a local bus using any variety of available bus architectures including, but not limited to, 8-bit bus, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Universal Serial Bus (USB), Advanced Graphics Port (AGP), Personal Computer Memory Card International Association bus (PCMCIA), and Small Computer Systems Interface (SCSI).

The system memory 1916 includes volatile memory 1920 and nonvolatile memory 1922. The basic input/output system (BIOS), containing the basic routines to transfer information between elements within the computer 1912, such as during start-up, is stored in nonvolatile memory 1922. By way of illustration, and not limitation, nonvolatile memory 1922 can include read only memory (ROM), programmable ROM (PROM), electrically programmable ROM (EPROM), electrically erasable PROM (EEPROM), or flash memory. Volatile memory 1920 includes random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM).

Computer 1912 also includes removable/non-removable, volatile/non-volatile computer storage media. FIG. 19 illustrates, for example a disk storage 1924. Disk storage 1924 includes, but is not limited to, devices like a magnetic disk drive, floppy disk drive, tape drive, Jaz drive, Zip drive, LS-100 drive, flash memory card, or memory stick. In addition, disk storage 1924 can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1924 to the system bus 1918, a removable or non-removable interface is typically used such as interface 1926.

It is to be appreciated that FIG. 19 describes software that acts as an intermediary between users and the basic computer resources described in suitable operating environment 1910. Such software includes an operating system 1928. Operating system 1928, which can be stored on disk storage 1924, acts to control and allocate resources of the computer 1912. System applications 1930 take advantage of the management of resources by operating system 1928 through program modules 1932 and program data 1934 stored either in system memory 1916 or on disk storage 1924. It is to be appreciated that one or more embodiments of the subject disclosure can be implemented with various operating systems or combinations of operating systems.

A user enters commands or information into the computer 1912 through input device(s) 1936. Input devices 1936 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1914 through the system bus 1918 via interface port(s) 1938. Interface port(s) 1938 include, for example, a serial port, a parallel port, a game port, and a universal serial bus (USB). Output device(s) 1940 use some of the same type of ports as input device(s) 1936. Thus, for example, a USB port may be used to provide input to computer 1912, and to output information from computer 1912 to an output device 1940. Output adapters 1942 are provided to illustrate that there are some output devices 1940 like monitors, speakers, and printers, among other output devices 1940, which require special adapters. The output adapters 1942 include, by way of illustration and not limitation, video and sound cards that provide a means of connection between the output device 1940 and the system bus 1918. It should be noted that other devices and/or systems of devices provide both input and output capabilities such as remote computer(s) 1944.

Computer 1912 can operate in a networked environment using logical connections to one or more remote computers, such as remote computer(s) 1944. The remote computer(s)

1944 can be a personal computer, a server, a router, a network PC, a workstation, a microprocessor based appliance, a peer device or other common network node and the like, and typically includes many or all of the elements described relative to computer 1912. For purposes of brevity, only a memory storage device 1946 is illustrated with remote computer(s) 1944. Remote computer(s) 1944 is logically connected to computer 1912 through a network interface 1948 and then physically connected via communication connection 1950. Network interface 1948 encompasses communication networks such as local-area networks (LAN) and wide-area networks (WAN). LAN technologies include Fiber Distributed Data Interface (FDDI), Copper Distributed Data Interface (CDDI), Ethernet/IEEE 802.3, Token Ring/IEEE 802.5 and the like. WAN technologies include, but are not limited to, point-to-point links, circuit switching networks like Integrated Services Digital Networks (ISDN) and variations thereon, packet switching networks, and Digital Subscriber Lines (DSL).

Communication connection(s) 1950 refers to the hardware/software employed to connect the network interface 1948 to the system bus 1918. While communication connection 1950 is shown for illustrative clarity inside computer 1912, it can also be external to computer 1912. The hardware/software necessary for connection to the network interface 1948 includes, for exemplary purposes only, internal and external technologies such as, modems including regular telephone grade modems, cable modems and DSL modems, ISDN adapters, and Ethernet cards.

FIG. 20 is a schematic block diagram of a sample computing environment 2000 with which the disclosed subject matter can interact. The sample computing environment 2000 includes one or more client(s) 2002. The client(s) 2002 can be hardware and/or software (e.g., threads, processes, computing devices). The sample computing environment 2000 also includes one or more server(s) 2004. The server(s) 2004 can also be hardware and/or software (e.g., threads, processes, computing devices). The servers 2004 can house threads to perform transformations by employing one or more embodiments as described herein, for example. One possible communication between a client 2002 and servers 2004 can be in the form of a data packet adapted to be transmitted between two or more computer processes. The sample computing environment 2000 includes a communication framework 2006 that can be employed to facilitate communications between the client(s) 2002 and the server(s) 2004. The client(s) 2002 are operably connected to one or more client data store(s) 2008 that can be employed to store information local to the client(s) 2002. Similarly, the server(s) 2004 are operably connected to one or more server data store(s) 2010 that can be employed to store information local to the servers 2004.

What has been described above includes examples of the subject innovation. It is, of course, not possible to describe every conceivable combination of components or methodologies for purposes of describing the disclosed subject matter, but one of ordinary skill in the art may recognize that many further combinations and permutations of the subject innovation are possible. Accordingly, the disclosed subject matter is intended to embrace all such alterations, modifications, and variations that fall within the spirit and scope of the appended claims.

In particular and in regard to the various functions performed by the above described components, devices, circuits, systems and the like, the terms (including a reference to a "means") used to describe such components are intended to correspond, unless otherwise indicated, to any component which performs the specified function of the described component (e.g., a functional equivalent), even though not structurally equivalent to the disclosed structure, which performs the function in the herein illustrated exemplary aspects of the disclosed subject matter. In this regard, it will also be recognized that the disclosed subject matter includes a system as well as a computer-readable medium having computer-executable instructions for performing the acts and/or events of the various methods of the disclosed subject matter.

In addition, while a particular feature of the disclosed subject matter may have been disclosed with respect to only one of several implementations, such feature may be combined with one or more other features of the other implementations as may be desired and advantageous for any given or particular application. Furthermore, to the extent that the terms "includes," and "including" and variants thereof are used in either the detailed description or the claims, these terms are intended to be inclusive in a manner similar to the term "comprising."

In this application, the word "exemplary" is used to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks [e.g., compact disk (CD), digital versatile disk (DVD) . . . ], smart cards, and flash memory devices (e.g., card, stick, key drive . . . ).

What is claimed is:

1. A safety scanner system, comprising:
a memory that stores executable components;
a processor, operatively coupled to the memory, that executes the executable components, the executable components comprising:
a light source component configured to emit a first beam of light during a first stage of a scan cycle;
a supplemental illumination component configured to emit a second beam of light during a second stage of the scan cycle, wherein the first stage and the second stage alternate in time;
a receiver array component configured to generate first image data during the first stage based on receipt of first reflected light comprising a portion of the first beam of light, and to generate second image data during the second stage based on receipt of second reflected light comprising a portion of the second beam of light;
a distance determination component configured to generate distance information based on triangulation analysis performed on the first image data; and
a hazard analysis and decision component generate a safety output signal in response to determining that the distance information satisfies a defined criterion, wherein the hazard analysis and decision component is further configured to, in response to detecting presence of an object during the second stage based on analysis of the second image data without detecting the presence of the object based on the triangulation analysis performed on the first image data, generate fault message data indicating a fault in the safety scanner system.

2. The safety scanner system of claim 1, wherein the analysis of the second image data comprises two-dimensional imaging analysis.

3. The safety scanner system of claim 1, wherein the analysis of the second image data comprises time-of-flight analysis.

4. The safety scanner system of claim 3, wherein
the object is a first object,
the distance information is first distance information,
the distance determination component is further configured to generate second distance information for a second object based on the time-of-flight analysis, and
the hazard analysis and decision component is further configured to generate other fault message data in response to determining that the second distance information does not correspond to the first distance information corresponding to the second object.

5. The safety scanner system of claim 1, wherein
the object is a first object, and
the hazard analysis and decision component is further configured to determine, based on imaging analysis performed on the second image data, a classification for a second object detected based on the triangulation analysis performed on the first image data.

6. The safety scanner system of claim 5, wherein the hazard analysis and decision component is further configured to generate the safety output signal in response to determining that the classification and the distance information satisfy a defined criterion.

7. The safety scanner of claim 5, wherein the classification is at least one of a person or a vehicle.

8. The safety scanner system of claim 1, wherein
the supplemental illumination component is a first supplemental illumination component,
the safety scanner system further comprises a second supplemental illumination component configured to emit a third beam of light directed to a floor during a third stage of the scan cycle,
the receiver array component is further configured to generate third image data during the third stage of the scan cycle based on receipt of third reflected light comprising a portion of the third beam of light, and
the hazard analysis and decision component is further configured to generate other fault message data in response to detecting, based on other analysis of the third image data, presence of a reflective surface.

9. The safety scanner system of claim 1, further comprising an interface component configured to send the safety output signal to an industrial device, wherein the industrial device is at least one of an industrial controller, a motor drive, or an industrial safety relay.

10. A method, comprising:
projecting, by a safety scanner system comprising a processor during a first stage of a scan cycle, a first beam of light;
generating, by the safety scanner system, first image data based on receipt of first reflected light comprising a portion of the first beam;
generating, by the safety scanner system, distance data based on triangulation analysis performed on the first image data;
projecting, by the safety scanner system during a second stage of the scan cycle, a second beam of light, wherein the projecting the first beam and the projecting the second beam are performed at alternate times;
generating, by the safety scanner system, second image data based on receipt of second reflected light comprising a portion of the second beam;
in response to determining that the distance data satisfies a defined criterion, outputting, by the safety scanner system, a safety signal; and
in response to detecting presence of an object based on analysis of the second image data during the second stage without detecting the presence of the object based on the triangulation analysis performed on the first image data during the first stage, generating, by the safety scanner system, fault message data indicating a fault in the safety scanner system.

11. The method of claim 10, wherein the detecting the presence of the object based on the analysis of the second image data comprises performing two-dimensional analysis of the second image data.

12. The method of claim 10, wherein the detecting the presence of the object based on the analysis of the second image data comprises performing time-of-flight analysis of the second image data.

13. The method of claim 12, wherein the distance data is first distance data, and the method further comprises:
generating, by the safety scanner system, second distance data based on the time-of-flight analysis performed on the second image data; and
response to determining that the second distance data does not match the first distance data within a defined tolerance, generating, by the safety scanner system, other fault message data.

14. The method of claim 10, wherein the object is a first object, and the method further comprises:
identifying, by the safety scanner system, presence of a second object based on the triangulation analysis performed on the first image data; and
determining, by the safety scanner system, a classification for the second object based on imaging analysis performed on the second image data.

15. The method of claim 14, wherein the outputting the safety signal comprises outputting the safety signal in response to determining that the distance data and the classification satisfy a defined criterion.

16. The method of claim 14, wherein the determining the classification comprises determining that the second object is at least one of a person or a vehicle.

17. The method of claim 10, further comprising:
projecting, by the safety scanner system during a third stage of the scan cycle, a third beam of light directed toward a floor;
generating, by the safety scanner system, third image data based on receipt of third reflected light comprising a portion of the third beam; and
in response to detecting presence of a reflective surface based on analysis of the third image data, generating, by the safety scanner system, other fault message data.

18. The method of claim 10, wherein the outputting the safety output signal comprises sending the safety output signal to at least one of an industrial controller, a motor drive, or an industrial safety relay.

19. A non-transitory computer-readable medium having stored thereon instructions that, in response to execution, cause a safety scanner system comprising a processor to perform operations, the operations comprising:
emitting, during a first stage of a scan cycle, a first beam of light;

generating first image data based on receipt of first reflected light comprising a portion of the first beam;

performing triangulation analysis on the first image data to yield distance information;

emitting, during a second stage of the scan cycle, a second beam of light, wherein the first beam and the second beam are emitted at alternate times;

generating second image data based on receipt of second reflected light comprising a portion of the second beam;

in response to determining that the distance information satisfies a defined criterion, generating a safety output signal; and in response to determining that analysis of the second image data detects presence of an object and that the triangulation analysis does not detect the presence of the object, generating fault message data indicating a fault in the safety scanner system.

20. The non-transitory computer-readable medium of claim 19, wherein the object is a first object, and the operations further comprise:

determining presence of a second object based on the performing the triangulation analysis; and determining a classification for the second object based on imaging analysis performed on the second image data.

* * * * *